US007016866B1

(12) United States Patent
Chin et al.

(10) Patent No.: US 7,016,866 B1
(45) Date of Patent: Mar. 21, 2006

(54) SYSTEM AND METHOD FOR ASSISTING THE BUYING AND SELLING OF PROPERTY

(75) Inventors: Wei Min Chin, Kuala Lumpur (MY); Suad Hooi Chia, Kuala Lumpur (MY); Kok Tih Nyeoh, Kuala Lumpur (MY); Mily Liang, Selangor (MY)

(73) Assignee: Accenture SDN. BHD., Petaling Jaya (MY)

( * ) Notice: Subject to any disclaimer, the term of this patent is extended or adjusted under 35 U.S.C. 154(b) by 714 days.

(21) Appl. No.: 09/722,341

(22) Filed: Nov. 28, 2000

(51) Int. Cl.
*G06F 17/60* (2006.01)
*G06F 15/38* (2006.01)

(52) U.S. Cl. .......................... 705/26; 705/27; 715/500
(58) Field of Classification Search ............ 705/26–28; G06F 17/60, 15/38
See application file for complete search history.

(56) References Cited

U.S. PATENT DOCUMENTS 5,592,375 A * 1/1997 Salmon et al. .................. 705/7

(Continued)

FOREIGN PATENT DOCUMENTS

JP 02000278678 A * 10/2000

(Continued)

OTHER PUBLICATIONS

Bisdiakian et al., Derwent-Acc-No.: 1999-610498, Automated search notifying method for trading on WEB, Oct. 26, 1999.*

(Continued)

*Primary Examiner*—Cuong Nguyen
(74) *Attorney, Agent, or Firm*—Fish & Richardson P.C.

(57) ABSTRACT

The invention provides systems and methods for assisting the buying and selling of properties. The invention serves as a single point of contact for sellers, buyers, negotiators and third party service providers in the real estate market, offering a forum for identifying needs, presenting solutions and accessing a suite of real estate tools and services.

An application architecture preferably includes resource applications, transaction applications, appointment management applications, advertising applications, and operations applications. A technical architecture preferably includes hardware that supports the application architecture, such as web servers serving web pages that serve as an online interface between the application architecture and the users. A business operation solution preferably includes independent but interacting product and content management functions, customer service functions, negotiator acquisition and management functions, operations support functions, marketing functions, alliance formation and management functions, technology operations functions, and back office support functions.

A method preferably includes providing an online interface that sellers can use to provide information regarding properties they wish to sell, that can be used to publish the property-for-sale information to many buyers, and that buyers can use to provide information regarding properties they wish to buy. The method further includes selecting a property for recommendation to the buyer and providing the online interface for recommending the property to the buyer. The method further includes facilitating a negotiation between the seller and the buyer as necessary to effect a closing of a transaction between the seller and the buyer for the property.

18 Claims, 34 Drawing Sheets

U.S. PATENT DOCUMENTS

| | | | | |
|---|---|---|---|---|
| 5,680,305 | A | * | 10/1997 | Apgar, IV .................... 705/10 |
| 5,734,720 | A | * | 3/1998 | Salganicoff ................. 380/211 |
| 5,754,938 | A | * | 5/1998 | Herz et al. ................... 725/116 |
| 5,754,939 | A | * | 5/1998 | Herz et al. ................. 455/3.04 |
| 5,835,087 | A | * | 11/1998 | Herz et al. ................... 715/810 |
| 5,845,266 | A | * | 12/1998 | Lupien et al. ................ 705/37 |
| 5,848,396 | A | * | 12/1998 | Gerace ......................... 705/10 |
| 5,937,387 | A | * | 8/1999 | Summerell et al. ............ 705/2 |
| 5,950,173 | A | * | 9/1999 | Perkowski .................... 705/26 |
| 5,983,200 | A | * | 11/1999 | Slotznick ..................... 705/26 |
| 6,012,046 | A | * | 1/2000 | Lupien et al. ................ 705/37 |
| 6,029,195 | A | * | 2/2000 | Herz ........................... 725/116 |
| 6,038,554 | A | * | 3/2000 | Vig ............................. 705/400 |
| 6,092,049 | A | * | 7/2000 | Chislenko et al. ............ 705/10 |
| 6,098,051 | A | * | 8/2000 | Lupien et al. ................ 705/37 |
| 6,108,640 | A | * | 8/2000 | Slotznick ..................... 705/26 |
| 6,112,181 | A | * | 8/2000 | Shear et al. .................... 705/1 |
| 6,134,548 | A | * | 10/2000 | Gottsman et al. .............. 707/5 |
| 6,219,654 | B1 | * | 4/2001 | Ruffin ......................... 705/400 |
| 6,266,649 | B1 | * | 7/2001 | Linden et al. ................ 705/26 |
| 6,269,339 | B1 | * | 7/2001 | Silver ............................. 705/2 |
| 6,272,467 | B1 | * | 8/2001 | Durand et al. ................. 705/1 |
| 6,324,517 | B1 | * | 11/2001 | Bingham et al. .............. 705/8 |
| 6,330,547 | B1 | * | 12/2001 | Martin ......................... 705/38 |
| 6,400,996 | B1 | * | 6/2002 | Hoffberg et al. ............. 700/83 |
| 6,418,424 | B1 | * | 7/2002 | Hoffberg et al. ............. 706/21 |
| 6,460,036 | B1 | * | 10/2002 | Herz ........................... 707/10 |
| 6,526,387 | B1 | * | 2/2003 | Ruffin et al. ................... 705/7 |
| 6,578,011 | B1 | * | 6/2003 | Forward ....................... 705/14 |
| 6,606,744 | B1 | * | 8/2003 | Mikurak ..................... 717/174 |
| 6,675,149 | B1 | * | 1/2004 | Ruffin et al. ................... 705/8 |
| 2001/0014868 | A1 | * | 8/2001 | Herz et al. ..................... 705/14 |
| 2002/0023051 | A1 | * | 2/2002 | Michael et al. | |

FOREIGN PATENT DOCUMENTS

JP          2000278678 A    *   10/2000

OTHER PUBLICATIONS

Gibson et al., Metaphorus and meaning: an intercultural analysis of the concept of teamwork, Administrative Science Quarterly Jun. 2001.*

Bragger et al., The effects of the structured interview on reducing biases against pregnant job applicants, Sex roles: a journ of research, Apr. 2002.*

Sankaran et al., Relationship between student characteristics and ethics: implications for educators, Journal of Instructional Psychology, Sep. 2003.*

Bisdikian et al., Derwent-Acc-No.: 1999-610498—Oct. 26, 1999, Automated search notifying method for trading on Web.*

Wind, Yoram—Designing product and business portfolios, Harvard Business Review, Jan./Feb. 1981, p. 155.*

Green et al., Conjoint analysis in marketing: new developments with implications for research and practice, Journal of Marketing, v54, n4, p3(17), Oct. 1990.*

Morrall, Those dazzling databases: choosing the right company, Bank Marketing, v27, n7, p97(4), Jul. 1995.*

Desarbo et al., Analyzing constant-sum mulitple criteron data: a segment-level approach, Journal of Marketing Research, v32, n2, p222(11), May 1995.*

Beighbeder, Easing workforce reduction, Risk Management, v47n5, pp. 26-30, May 2000.*

Louviere et al., Multiple correspondence analysis of multiple choice experiment data, Journal of Marketing Research, v27, n4, p455(11), Nov. 1990.*

* cited by examiner

| Seller Fulfilment Flow | Submit a property for sale | Monitor the progress of the property sale | Close the deal with buyer |
|---|---|---|---|
| Web-front | (45) Submit a property for sale online | (56) Seller's portfolio provides an update to the user on the progress of the property | |
| Backend Support Tool and Operational Team | (52) Backend operational team will review the property for sale<br><br>(54) If the information is not complete, the backend operational team will contact the seller and assist him/her to complete the details<br><br>(46) Once the details are complete, the property will be published for sale<br><br>(70) A Negotiator will be assigned the property | (74) Each property is assigned to a negotiator whom the seller can also contact for progress<br><br>(72) Negotiators will also be responsible for managing all visits to the property site | (80) Backend operational team supports the negotiator when a property is sold<br><br>(58) Backend operational team will update the availability of the product to sold |

FIG. 4

| Buyer Fulfillment Flow | Get pre-approved loan | Searching for a property | (60) Schedule appointment to view the property | View the property | Close the deal with seller | Finalize the deal with other third parties (bank) | Beautify the property |
|---|---|---|---|---|---|---|---|
| Web-front | (84) Apply for a pre-approved loan online<br><br>(84) Loan application statuses are updated through alerts | (48) User searches for a property online<br><br>(50) Properties are recommended to users based on the user profiles | (64) Appointments to view a property can be scheduled online<br><br>(64) Monitor status of appointment | | (59) Online confirmation of the deal | (88) Apply for a banking product (home loan) online | (92) User searches for home furnishing products to beautify his/her home |
| Backend Support Tool and Operations Team | (86) Pre-approved loan applications are retrieved from the backend support tool and forwarded to the bank<br><br>(86) Backend operational team will continue to liase with the bank to track the status of the pre-approved loan<br><br>(86) Backend operational team updates the loan status upon confirmation from the bank | | (66) Appointments can also be scheduled through the call center<br><br>(66) Users can reschedule their appointments through the call center<br><br>(62) The backend operational team will confirm the appointments with negotiators and inform the user of the confirmed time through the phone | (61) Property visits are conducted with negotiators | (80) Backend operational team supports the negotiator when a property is sold<br><br>(58) Backend operational team will update the availability of the product to sold | (90) Retrieve home loan application and forward to bank<br><br>(90) The backend operational team will continue to monitor the status of the loan application | |

FIG. 5

| Negotiator Fulfilment Flow | Assigned a property to sell | Appointments tracking | Commission tracking |
|---|---|---|---|
| Web-front | (78) A negotiator is able to monitor the status of properties assigned to him/her through the portfolio<br><br>(76) A negotiator is able to identify new properties assigned to him/her through his/her portfolio | (79) Negotiator is able to view all appointments online | |
| Backend Support Tool and Operations Team | (70) Properties are assigned to negotiators through the backend tool | (62) The backend operational team will confirm appointments with negotiators and inform the user of the confirmed time | (82) The backend support team will monitor and track all commissions to be paid to the negotiator |

FIG. 6

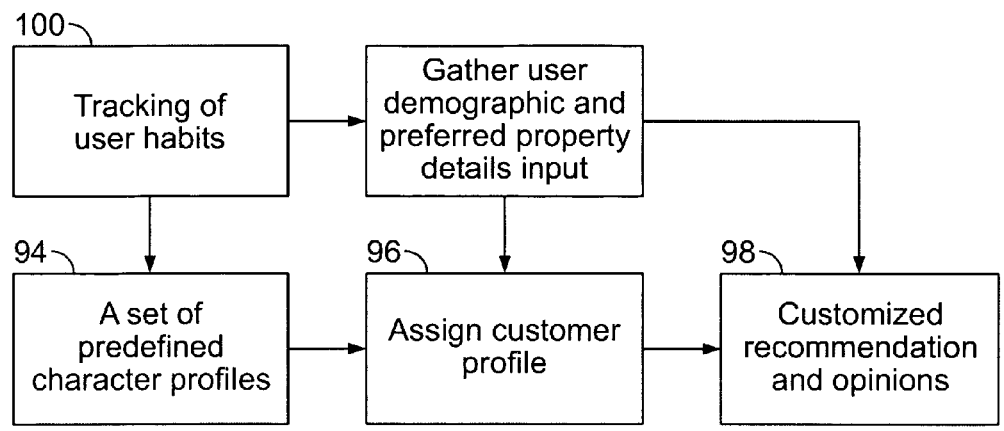

FIG. 17

| Character Type | Definition |
|---|---|
| Yuppie | Young professionals, working class, busy lifestyle (Mostly between 20 to 35) |
| Establ'd Family | Families with teenage children (Parents mostly between 35 to 50) |
| Elderly | Retired (Mostly above 50 years of age) |
| Etc... | |

FIG. 18A

| Attribute Category | Attributes |
|---|---|
| Demographic | Age, Marital Status, Income Range, No. of Children, Nationality, etc. |
| Property Attributes | Neighborhood, Property Type, Build-up Area, etc. |
| Etc... | |

FIG. 18B (a) Age

| Attribute Subsets | Yuppie | Expatriate | Young Family | Establ'd Family | Teenager | Elderly | No Profile | Total |
|---|---|---|---|---|---|---|---|---|
| 0 to 10 | 0 | 0 | 0 | 0 | 20 | 0 | 80 | 100 |
| 10 to 20 | 0 | 0 | 0 | 0 | 100 | 0 | 0 | 100 |
| 20 to 30 | 80 | 10 | 10 | 0 | 0 | 0 | 0 | 100 |
| 30 to 40 | 10 | 5 | 70 | 10 | 0 | 0 | 0 | 100 |
| 40 to 50 | 5 | 0 | 10 | 80 | 0 | 0 | 0 | 100 |
| 50 to 60 | 0 | 0 | 0 | 10 | 0 | 90 | 0 | 100 |
| 60 and above | 0 | 0 | 0 | 0 | 0 | 100 | 0 | 100 |
| Total | | | | | | | | 700 |

A total of 100 points is distributed to each age group based on the likeliness of each character type to fit the age group.

(b) Income Range

| Attribute Subsets | Yuppie | Expatriate | Young Family | Establ'd Family | Teenager | Elderly | No Profile | Total |
|---|---|---|---|---|---|---|---|---|
| RM 0 | 0 | 0 | 0 | 0 | 100 | 0 | 0 | 100 |
| RM 50,000 and below | 25 | 25 | 0 | 0 | 0 | 50 | 0 | 100 |
| RM 51,000 to RM 100,000 | 50 | 10 | 30 | 5 | 0 | 5 | 0 | 100 |
| RM 100,001 to RM 150,000 | 40 | 10 | 40 | 5 | 0 | 5 | 0 | 100 |
| RM 150,001 to RM 200,000 | 30 | 10 | 40 | 15 | 0 | 5 | 0 | 100 |
| RM 200,001 to RM 250,000 | 20 | 10 | 40 | 25 | 0 | 5 | 0 | 100 |
| RM 250,001 to RM 300,000 | 10 | 10 | 35 | 40 | 0 | 5 | 0 | 100 |
| RM 300,001 and above | 5 | 10 | 25 | 55 | 0 | 5 | 0 | 100 |
| Total | | | | | | | | 800 |

(c) Etc...

FIG. 18C

Sample questions:
i. Rank your preferred property neighborhood

Rank a) Bangsar      1
b) Shah Alam   3
c) KLCC        2
d) Petaling Jaya  4 ii. Rank your preferred type of property       Rank a) Terrace House

User X Demographic Data
Age: 30 years old                    Income Range: RM 200,000 per annum
No. of Children: No children     Age of Oldest Child: nil
Nationality: Malaysian

User X Preferred Property Data

Preferred Neighborhood
1st Neighborhood Choice: Bangsar        2nd Neighborhood Choice: Shah Alam
3rd Neighborhood Choice: KLCC          4th Neighborhood Choice: Petaling Jaya Preferred Property Type:
1st Property Type Choice: Condominium   2nd Property Type Choice: Terrace House

FIG. 19B

| Details (Demographics) | Weightage | Yuppie | Expatriate | Young Family | Establ'd Family | Teenager | Elderly | No Profile | Total |
|---|---|---|---|---|---|---|---|---|---|
| 35 years old | 0.167 | 10 | 10 | 70 | 10 | 0 | 0 | 0 | 100 |
| 0 Children | 0.167 | 75 | 10 | 5 | 5 | 0 | 5 | 0 | 100 |
| Income of RM 200,000 | 0.167 | 30 | 10 | 40 | 15 | 0 | 5 | 0 | 100 |
| Nationality: Malaysian | 0.167 | 20 | 0 | 20 | 20 | 20 | 20 | 0 | 100 |
| Single | 0.167 | 70 | 10 | 0 | 0 | 20 | 0 | 0 | 100 |
| Nil (Oldest Child Age) | 0.167 | 40 | 10 | 0 | 0 | 40 | 10 | 0 | 100 |
| | | | | | | | | | |
| 35 years old | | 1.667 | 1.667 | 11.667 | 1.667 | 0.000 | 0.000 | 0.000 | 16.667 |
| 0 Children | | 12.500 | 1.667 | 0.833 | 0.833 | 0.000 | 0.833 | 0.000 | 16.667 |
| Income of RM 200,000 | | 5.000 | 1.667 | 6.667 | 2.500 | 0.000 | 0.833 | 0.000 | 16.667 |
| Nationality: Malaysian | | 3.333 | 0.000 | 3.333 | 3.333 | 3.333 | 3.333 | 0.000 | 16.667 |
| Single | | 11.667 | 1.667 | 0.000 | 0.000 | 3.333 | 0.000 | 0.000 | 16.667 |
| Nil (Oldest Child Age) | | 6.667 | 1.667 | 0.000 | 0.000 | 6.667 | 1.667 | 0.000 | 16.667 |
| Demographic Total | | 40.833 | 8.333 | 22.500 | 8.333 | 13.333 | 6.667 | 0.000 | 100.000 |
| Demographic Weightage | | 41% | 8% | 23% | 8% | 13% | 7% | 0% | 100% |

Predefined character type (demographic points assigned to each character type)

User X's demographic attribute values. The predefined value is multiplied by the weightage to obtain the final value As a result, based only on demographic attributes, User X is 41% - Yuppie
8% - Expatriate
23% - Young Family
8% - Established Family
13% - Teenager
7% - Elderly

FIG. 19C

| Neighborhood | Weightage | Yuppie | Expatriate | Young Family | Establ'd Family | Teenager | Elderly | No Profile | Total |
|---|---|---|---|---|---|---|---|---|---|
| Bangsar | 0.25 | 70 | 20 | 0 | 10 | 0 | 0 | 0 | 100 |
| Shah Alam | 0.25 | 5 | 0 | 35 | 40 | 0 | 20 | 0 | 100 |
| KLCC | 0.25 | 70 | 20 | 0 | 10 | 0 | 0 | 0 | 100 |
| PJ | 0.25 | 20 | 10 | 20 | 20 | 10 | 20 | 0 | 100 |
|  |  |  |  |  |  |  |  |  |  |
| Bangsar |  | 17.50 | 5.00 | 0.00 | 2.50 | 0.00 | 0.00 | 0.00 | 25 |
| Shah Alam |  | 1.25 | 0.00 | 8.75 | 10.00 | 0.00 | 5.00 | 0.00 | 25 |
| KLCC |  | 17.50 | 5.00 | 0.00 | 2.50 | 0.00 | 0.00 | 0.00 | 25 |
| PJ |  | 5.00 | 2.50 | 5.00 | 5.00 | 2.50 | 5.00 | 0.00 | 25 |
| Total |  | 41.25 | 12.50 | 13.75 | 20.00 | 2.50 | 10.00 | 0.00 | 100.00 |
| Neighborhood Weightage |  | 41% | 13% | 14% | 20% | 3% | 10% | 0% | 100% |

Based on the top 4 preferred neighborhood chosen by User X, the system calculates User X's preferred neighborhood weightage.

41% - Yuppie
13% - Expatriate
14% - Young Family
20% - Established Family
3% - Teenager
10% - Elderly

FIG. 19D

| Property Type | Weightage | Yuppie | Expatriate | Young Family | Establ'd Family | Teenager | Elderly | No Profile | Total |
|---|---|---|---|---|---|---|---|---|---|
| Condominium | 0.50 | 70 | 20 | 10 | 0 | 0 | 0 | 0 | 100 |
| Terrace House | 0.50 | 10 | 0 | 70 | 10 | 0 | 10 | 0 | 100 |
| | | | | | | | | | |
| Condominium | | 35.00 | 10.00 | 5.00 | 0.00 | 0.00 | 0.00 | 0.00 | 50.00 |
| Terrace House | | 5.00 | 0.00 | 35.00 | 5.00 | 0.00 | 5.00 | 0.00 | 50.00 |
| Total | | 40.00 | 10.00 | 40.00 | 5.00 | 0.00 | 5.00 | 0.00 | 100.00 |
| Property Type Weightage | | 40% | 10% | 40% | 5% | 0% | 5% | 0% | 100% |

FIG. 19E

Based on the top 2 preferred property types chosen by User X, the system calculates User X's property type weightage 40% - Yuppie
10% - Expatriate
40% - Young Family
5% - Established Family
0% - Teenager
5% - Elderly

| Property Details | Weightage | C1 | C2 | C3 | C4 | C5 | C6 | C7 | Total |
|---|---|---|---|---|---|---|---|---|---|
| Neighborhood Weightage | 0.70 | 41% | 13% | 14% | 20% | 3% | 10% | 0% | 100% |
| Property Type Weightage | 0.30 | 40% | 10% | 40% | 5% | 0% | 5% | 0% | 100% |
|  |  |  |  |  |  |  |  |  |  |
| Neighborhood Weightage |  | 29% | 9% | 10% | 14% | 2% | 7% | 0% | 70% |
| Property Type Weightage |  | 12% | 3% | 12% | 2% | 0% | 2% | 0% | 30% |
| Preferred Property Weightage |  | 41% | 12% | 22% | 16% | 2% | 9% | 0% | 100% |

Based on the neighbourhood and property type weightage determined for User X, his property weightage to be:

41% - Yuppie          16% - Established Family
12% - Expatriate      2% - Teenager
22% - Young Family    9% - Elderly

FIG. 19F

| | Weightage | C1 | C2 | C3 | C4 | C5 | C6 | C7 | Total |
|---|---|---|---|---|---|---|---|---|---|
| Demographics Weightage | 0.30 | 41% | 8% | 23% | 8% | 13% | 7% | 0% | 100% |
| Property Weightage | 0.70 | 41% | 12% | 22% | 16% | 2% | 9% | 0% | 100% |
| Demographic Total |  | 12% | 3% | 7% | 3% | 4% | 2% | 0% | 30% |
| Property Total |  | 29% | 8% | 15% | 11% | 1% | 6% | 0% | 70% |
| Total |  | 41% | 11% | 22% | 13% | 5% | 8% | 0% | 100% |

User X has a unique character profile score of:

41% - Yuppie          13% - Established Family
11% - Expatriate      5% - Teenager
22% - Young Family    8% - Elderly

FIG. 19G

(a) Neighborhood

| Classification | C1 | C2 | C3 | C4 | C5 | C6 | C7 | Total |
|---|---|---|---|---|---|---|---|---|
| Bangsar | 55 | 20 | 5 | 10 | 5 | 5 | 0 | 100 |
| KLCC | 55 | 20 | 5 | 10 | 5 | 5 | 0 | 100 |
| PJ | 20 | 10 | 20 | 20 | 10 | 20 | 0 | 100 |
| Gombak | 5 | 5 | 60 | 10 | 10 | 10 | 0 | 100 |
| Klang | 10 | 5 | 45 | 25 | 5 | 10 | 0 | 100 |
| Shah Alam | 5 | 5 | 30 | 35 | 5 | 20 | 0 | 100 |
| Total | 150 | 65 | 165 | 110 | 40 | 70 | 0 | 600 |

(b) Property Type

| Classification | C1 | C2 | C3 | C4 | C5 | C6 | C7 | Total |
|---|---|---|---|---|---|---|---|---|
| Condominium | 40 | 20 | 10 | 5 | 20 | 5 | 0 | 100 |
| Terrace House | 10 | 5 | 60 | 10 | 5 | 10 | 0 | 100 |
| Semi-detached | 5 | 10 | 20 | 50 | 5 | 10 | 0 | 100 |
| Bungalow | 5 | 20 | 10 | 55 | 5 | 5 | 0 | 100 |
| Total | 60 | 55 | 100 | 120 | 35 | 30 | 0 | 400 |

(c) Etc...

FIG. 20A

| User X | | Property Attributes | | | | |
|---|---|---|---|---|---|---|
| Characteristics | User X Character Profile | Neighborhood | Property Type | Buildup Area | \{Predefined character property attribute points assigned to each character type\} | |
| | | | | | Buildup Area | No. of Rooms |
| Property ID : BGS 1001 | | Bangsar | Condo | 2200 sq. Feet | | 3 Bedroom |
| Yuppie | 41 | 55 | 40 | 30 | | 5 |
| Expatriate | 11 | 20 | 20 | 10 | | 10 |
| Young Family | 22 | 5 | 10 | 20 | | 50 |
| Establ'd Family | 13 | 10 | 5 | 0 | | 10 |
| Teenager | 5 | 5 | 20 | 10 | | 20 |
| Elderly | 8 | 5 | 5 | 30 | | 5 |
| Map User to Property | | | | | | |
| Yuppie | | 2255 | 1640 | 1230 | | 205 |
| Expatriate | | 220 | 220 | 110 | | 110 |
| Young Family | | 110 | 220 | 440 | | 1100 |
| Establ'd Family | | 130 | 65 | 0 | | 130 |
| Teenager | | 25 | 100 | 50 | | 100 |
| Elderly | | 40 | 40 | 240 | | 40 |
| Sub Total | | 2780 | 2285 | 2070 | | 1685 |
| Total | | (8820) | | | | |

FIG. 20B

| User X | | Property Attributes | | | |
|---|---|---|---|---|---|
| Characteristics | Character Profile | Neighborhood | Property Type | Buildup Area | No. of Rooms |
| Property ID : BGS 1002 | | Bangsar | Condo | 2200 sq. Feet | 3 Bedroom |
| Yuppie | 41 | 55 | 5 | 30 | 5 |
| Expatriate | 11 | 20 | 20 | 10 | 10 |
| Young Family | 22 | 5 | 10 | 20 | 50 |
| Establ'd Family | 13 | 10 | 55 | 0 | 10 |
| Teenager | 5 | 5 | 5 | 10 | 20 |
| Elderly | 8 | 5 | 5 | 30 | 5 |
| | | Calculation | | | |
| Yuppie | | 2255 | 205 | 1230 | 205 |
| Expatriate | | 220 | 220 | 110 | 110 |
| Young Family | | 110 | 220 | 440 | 1100 |
| Establ'd Family | | 130 | 715 | 0 | 130 |
| Teenager | | 25 | 25 | 50 | 100 |
| Elderly | | 40 | 40 | 240 | 40 |
| Sub Total | | 2780 | 1425 | 2070 | 1685 |
| Total | | (7960) | | | |

FIG. 20C

| Property ID | User X Score | Rank |
|---|---|---|
| BGS 1001 | 8820 | 1 |
| BGS 1003 | 8600 | 2 |
| KLC 1001 | 8530 | 3 |
| KLC 1002 | 8200 | 4 |
| BGS 1002 | 7690 | 5 |
| BGS 1004 | 6910 | 6 |

In this scenario, BGS 1001 is ranked No.1 for User X and BGS 1002 is ranked No.4. These results can be used to recommend the most relevant properties to User X.

|  |  | Neighborhood |  |  |  |  |  | Property Type |  |  |  |
|---|---|---|---|---|---|---|---|---|---|---|---|
|  |  | KLCC | Bangsar | PJ | Klang | Gombak | Shah Alam | Condo | Terrace | Semi-D | Bungalow |
| 1) | Search for a Property |  |  |  |  |  |  |  |  |  |  |
|  | - PJ, Terrace House |  |  | 1 |  |  |  |  | 1 |  |  |
|  | - Bangsar, Condo | 1 |  |  |  |  |  | 1 |  |  |  |
| 2) | Profile Search |  |  |  |  |  |  |  |  |  |  |
|  | - KLCC, Condo | 2 |  |  |  |  |  | 2 |  |  |  |
|  | - PJ, Terrace House |  |  | 2 |  |  |  |  | 2 |  |  |
|  | - PJ, Semi-Detach |  |  | 2 |  |  |  |  |  | 2 |  |
|  | - Bangsar, Condo |  | 2 |  |  |  |  | 2 |  |  |  |
| 3) | Neighborhood Price Index |  |  |  |  |  |  |  |  |  |  |
|  | - KLCC, Condo | 1 |  |  |  |  |  | 1 |  |  |  |
|  | - PJ, Terrace House |  |  | 1 |  | 1 |  |  | 1 |  |  |
|  | - Bangsar, Terrace House |  | 1 |  |  |  |  |  | 1 |  |  |
| 4) | Favorite List |  |  |  |  |  |  |  |  |  |  |
|  | - Bangsar, Condo | 2 |  |  |  |  |  | 2 |  |  |  |
|  | - PJ, Bungalow |  |  | 2 |  |  |  |  |  |  | 2 |
|  | - PJ, Terrace House |  |  | 2 |  |  |  |  | 2 |  |  |
|  | - PJ, Terrace House |  |  | 2 |  |  |  |  | 2 |  |  |
| 5) | Latest Matches |  |  |  |  |  |  |  |  |  |  |
|  | - Bangsar, Bungalow |  | 1 |  |  |  |  |  |  |  | 1 |
|  | - PJ, Terrace House |  | 1 |  |  |  |  |  | 1 |  |  |
|  | - PJ, Terrace House |  | 1 |  |  |  |  |  | 1 |  |  |
|  | - Bangsar, Terrace House |  |  | 1 |  |  |  |  | 1 |  |  |
| 6) | Request for an Appointment |  |  |  |  |  |  |  |  |  |  |
|  | - Bangsar, Condo |  | 5 |  |  |  |  | 5 |  |  |  |
|  | - Petaling Jaya, Terrace House |  |  | 5 |  |  |  |  | 5 |  |  |
|  | - Petaling Jaya, Semi-Detach |  |  | 5 |  |  |  |  |  | 5 |  |
| Sub Total |  | 6 | 11 | 23 | 0 | 0 | 1 | 13 | 17 | 7 | 3 |
| Total |  | 81 |  |  |  |  |  |  |  |  |  |

FIG. 21

SYSTEM AND METHOD FOR ASSISTING THE BUYING AND SELLING OF PROPERTY

FIELD OF THE INVENTION

This invention relates generally to systems and methods for real estate services and specifically to systems and methods for assisting the buying and selling of property.

BACKGROUND OF THE INVENTION

The buying and selling of property typically involves players of varying skill and experience that are unable to interact in ways that optimize the real estate market. Project developers, for example, have extensive experience in buying and selling property. However, due to travel and communication limitations existing in the real estate market to date, these entities are unable to advertise to many sellers and buyers who may be interested in the developers' properties. The inability to determine market players' preferences prevents developers from reaching a large market without wasting advertising dollars on disinterested individuals. Often, announcements of new projects do not reach the parties who are willing to pay top dollar for the new houses. These and other common scenarios result in lost revenue to project developers.

Other players in the real estate market, such as individual sellers and buyers, have either sold or bought only one or two properties and often do not have the experience necessary to avoid paying a higher price for a property than the market is willing to bear or selling a property at a lower price than the market is willing to bear. These inexperienced players also fall victim to rapidly fluctuating market conditions. Unfortunately, many buyers settle for a property in which they are not particularly interested in because time constraints and physical limitations prevent them from exploring all of their purchasing options. Similarly, many sellers agree to sell to low-bidding buyers because of outside pressures that prevent them from holding out for a higher bid. In addition, unless they spend many hours in research, these individuals are rarely aware of major events and trends in the real estate market that would affect their purchasing or selling decision. They are unaware of available tools and are unaware of how to effectively use those tools. Even if the decision to sell or buy is a sound one, the process of submitting and tracking loan applications can be a daunting task given the myriad legal requirements.

Middlemen, such as real estate brokers, are skilled at negotiating property transactions between buyers and sellers. However, even with access to many resources, brokers are unable to reach all of the interested players. Typically, a real estate broker is negotiating a deal that is likely to fail, while inadvertently foregoing deals that are more likely to succeed. Many factors contribute to this scenario, such as lack of communication, lack of knowledge about the parties' needs, and inability to effectively manage appointments. Buyers who may be interested in a property become disinterested when faced with inconvenience and lack of information. These factors weigh against real estate brokers to reduce potential commissions.

Therefore, there is a need to enhance existing systems and method for assisting the buying and selling of property.

SUMMARY OF THE INVENTION

The invention provides systems and methods for assisting the buying and selling of properties. The invention serves as a point of contact for sellers, buyers, negotiators and third party service providers in the real estate market, offering a forum for identifying needs, presenting solutions and accessing a suite of real estate tools and services.

In an embodiment, a system of the invention includes a technology solution having an application architecture and a technical architecture for supporting the application architecture; a business operation solution that uses the technology solution to assist the buying and selling of properties; and at least one third party relationship that assists the buying and selling of properties.

The application architecture preferably includes resource applications enabling users to access real estate information and tools; transaction applications enabling users to register, submit preference information, provide property information (regarding properties to sell or to buy), and apply for loans; appointment management applications enabling users to request, confirm and cancel appointments; advertising applications enabling market players to advertise real estate-related offerings to users; and operations applications for managing the operation of the system.

The technical architecture preferably includes hardware that supports the application architecture, such as web servers serving web pages that can be accessed by user computers connected to the web servers via the Internet. The web pages serve as an online interface between the application architecture and the users.

The business operation solution preferably includes independent but interacting product and content management functions for presenting news and information to users; customer service functions for addressing user inquiries and needs; negotiator acquisition and management functions for assigning negotiators and managing negotiators' involvement in transactions and appointments; operations support functions for accepting property-for-sale information and loan applications; marketing functions for obtaining feedback from users; alliance formation and management functions for forming third party alliances to address a wide range of user needs; technology operations functions for tracking user activities and preferences; and back office support functions for human resource, financial and administrative management.

In another embodiment, a method of the invention includes providing an online interface that sellers can use to provide information regarding properties they wish to sell, that can be used to publish the property-for-sale information to many buyers, and that buyers can use to provide information regarding properties they wish to buy. That is, sellers can use the online interface to post properties for sale knowing that the information will be accessed by buyers who are ready to purchase a property. Similarly, buyers can use the online interface to search for a desired property. The method further includes selecting a property for recommendation to the buyer and providing the online interface for recommending the property to the buyer. That is, once the property-to-buy information is received, the method selects a property and recommends the property to the buyer through the online interface. The method further includes facilitating a negotiation between the seller and the buyer as necessary to effect a closing of a transaction between the seller and the buyer for the property.

Seller portfolios can be established to enhance the convenience of sellers who wish to monitor the status of their property. The portfolios may indicate how many buyers have asked for more information, how many times the property has been listed in search results and whether a buyer is interested in visiting the property. Preferably, the buyer is able to search for properties, maintain a list of favorite properties, and monitor the progress of any transactions in which he/she is engaged. If the buyer wishes to visit the property, he/she may schedule appointments online and visit the property offline.

Preferably the method provides for the acquisition and management of negotiators who are assigned to assist in facilitating transactions between interested parties. The negotiators not only provide a human point of contact, but also provide assistance with appointments and closing activities. Negotiators portfolios can be established to show which properties the negotiator has been assigned and the status of commissions to be received by the negotiator.

Other services may be provided for the convenience of users, such as, for example, enabling the submission of pre-approved loan applications that are forwarded to a bank and tracked to report the status of the application to the user; enabling the searching for home furnishings that are also recommended as desired; and enabling the availability and use of real estate transaction tools such as loan calculators.

Registered users may receive customer service that assists in training the user on the use of the online interface and directing the user to sources of information. Users have access to real estate-related content on the online interface, such as, for example, buying guides, personalized news, frequently-asked questions, and property reviews. Users may also be presented with advertisements on the online interface that offer products and services related to the real estate market.

In still another embodiment, profiles can be established for each user to enhance the user's experience by personalizing and customizing the online interface and the activities in which the user engages. The profile can be used to recommend properties, but also to recommend tools, information, and third party services that are relevant to the user. A preferred character profiling method of the invention includes defining a plurality of character types, defining a plurality of character attributes divided into character attribute subsets, defining a character profile matrix representing the likelihood that a person of at least one of the character types will fit into at least one of the character attribute subsets, assigning a character profile score to each user using the character profile matrix, and providing at least one of a customized recommendation and a customized opinion to the user based on the character profile score.

During a registration process, and through each user's subsequent interaction with the online interface, demographic, neighborhood and property preference data can be obtained for each user. The mapping of each user in the character profile matrix preferably includes passing the demographic, neighborhood and property preference data through respective matrices to calculate weightages that indicate, for each of the preference data groups, the relative degree of similarity of the user to each of the pre-defined character types.

Recommendations can be made by passing the character profile scores through recommendation object profile matrices to calculate recommendation object profile scores that are ranked to determine the recommendation objects most relevant to the user. The recommendation object can be, for example, a property, a tool, a new project listing, an article, a pricing index, a promotion, a sorting preference, and/or a home furnishing.

Finally, the method preferably provides for the tracking of each user's interaction with the online interface to not only sharpen the character profile scores, but also to more accurately define the pre-defined character types. Examples of actions that are tracked include property searches, profile searches, property price searches, changes to a list of favorite properties, requests to view detailed information regarding a property, requests for appointments to visit properties, and applications for loans.

BRIEF DESCRIPTION OF THE DRAWINGS

FIG. 4 is a chart illustrating a seller's exemplary interaction with the invention.

FIG. 5 is a chart illustrating a buyer's exemplary interaction with the invention.

FIG. 6 is a chart illustrating a negotiator's exemplary interaction with the invention.

FIG. 17 is a flowchart showing an exemplary character profiling method of the invention.

FIGS. 18a–18c are charts illustrating exemplary pre-defined character types according to a method of the invention.

FIG. 19a shows an exemplary questionnaire used in a method of the invention.

FIG. 19b shows exemplary data obtained by a character profiling method of the invention.

FIGS. 19c–19g are charts illustrating determinations of a demographic weightage, a neighborhood weightage, a property type weightage, a property weightage, and a character profile score according to respective methods of the invention.

FIG. 20a is a chart illustrating a recommendation object profile matrix according to a method of the invention.

FIGS. 20b and 20c are charts illustrating determinations of recommendation object profile scores of first and second properties according to a method of the invention.

FIG. 20d is a chart illustrating a ranking of recommendation object profile scores according to a method of the invention.

FIG. 20e is an exemplary image of a personalized web page according to a method of the invention.

FIG. 21 is a chart illustrating a result of tracking a plurality of interactions between a system of the invention and a user of the system.

DETAILED DESCRIPTION OF THE PREFERRED EMBODIMENT

Figure 1:
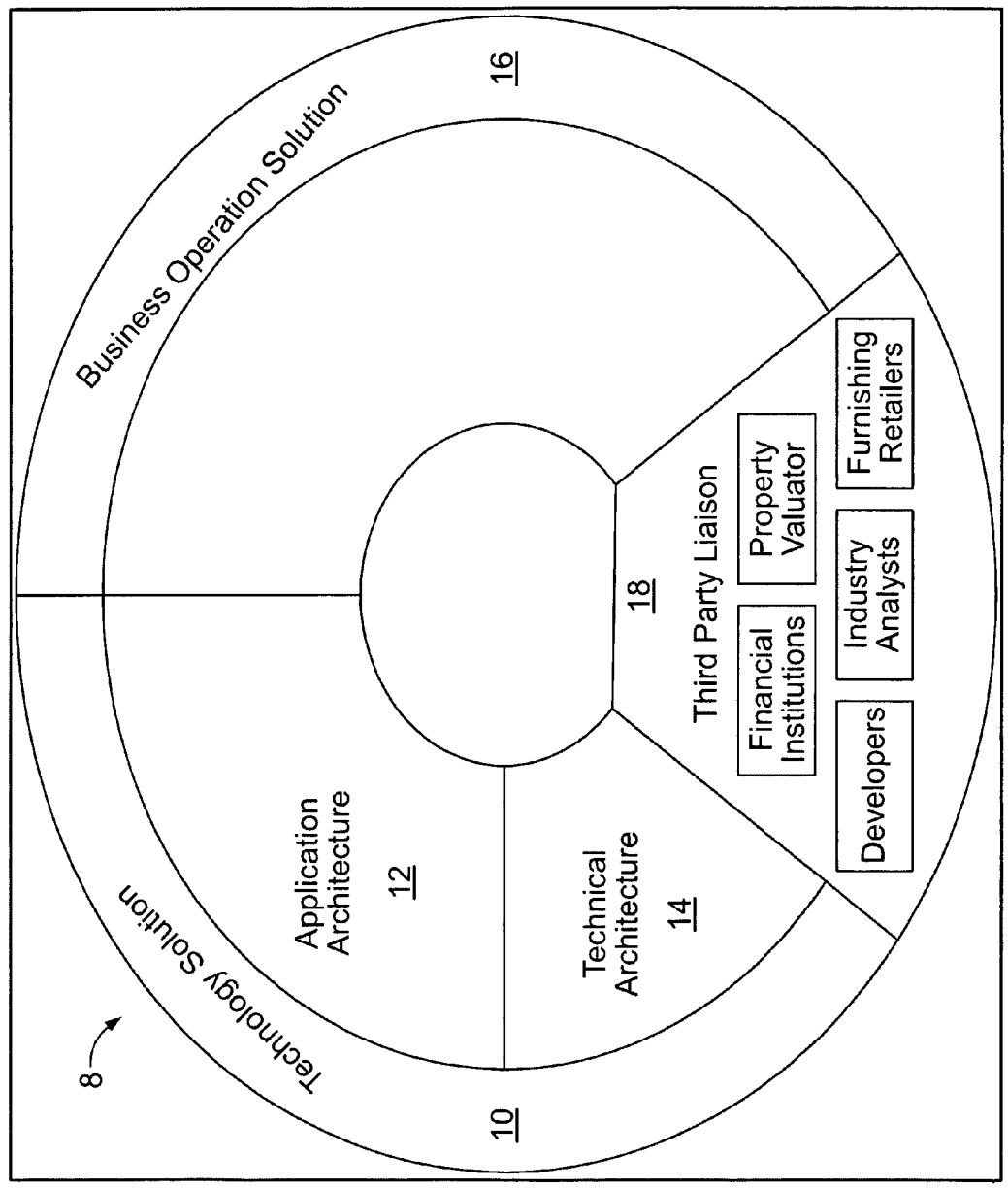
FIG. 1 is a diagram showing one embodiment of a system of the invention.

The invention provides systems and methods for assisting the buying and selling of properties. FIG. 1 illustrates one embodiment of a system 8 of the invention that includes a technology solution 10 having an application architecture 12 that includes at least one application for assisting the buying and selling of properties, and a technical architecture 14 for supporting the application architecture 12. A business operation solution 16 that uses the technology solution 10 to assist the buying and selling of properties, and at least one third party relationship 18 that assists the buying and selling of properties, are also included in the system 8.

Figure 2:
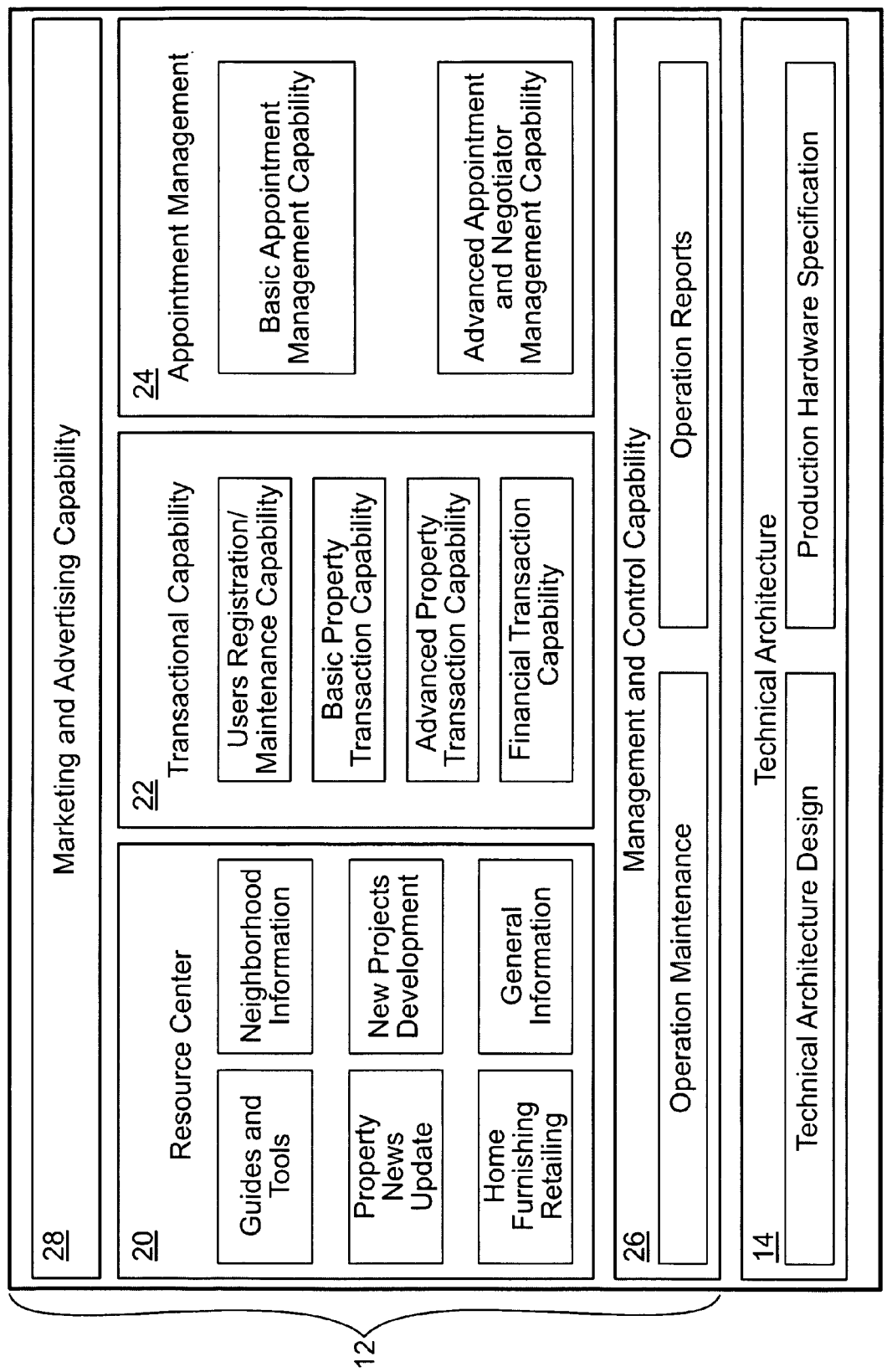
FIG. 2 is a diagram showing an exemplary technology solution of a system of the invention.

FIG. 2 illustrates an exemplary technology solution 10 of the system 8. The technology solution 10 includes the application architecture 12 that has at least one resource application 20 providing a user of the system 8 with the ability to access at least one resource, at least one transaction application 22 providing the user with the ability to participate in at least one transaction, and at least one appointment management application 24 for managing at least one negotiator assigned to assist in facilitating a negotiation to effect a closing of a transaction for a property, for managing at least one appointment for the user to visit a property with the negotiator, and for providing the user with the ability to request the appointment and monitor the status of the appointment after the appointment is scheduled. At least one operations application 26 for managing operation of the system 8 is also part of the application architecture 12.

The resource can include at least one of a real estate transaction guide, real estate transaction advice, a real estate transaction checklist, a real estate transaction tool, neighborhood information, real estate news, new project information, home furnishing retail services, real estate market information, legal information, a loan calculator, an estimated selling price, contact information for a furniture retailer, and a link to a website containing any one of the preceding items. The system 8 can offer such resources to users throughout the process of buying or selling a home by making the resources accessible through the online interface. For example, point-of-need resources are provided on the online interface to deliver relevant advice, checklists, tools and useful links to users at the moment the resources are needed; the resources may be directed toward guiding users to an informed decision when buying or selling property; or a price index resource may be provided for selected neighborhoods to assist the seller in determining a selling price.

The user's participation in the transaction includes at least one of registering with the system 8, searching for a property, browsing for a property, viewing information about a property, viewing information about a neighborhood, viewing real estate news, viewing financing information, accessing a list of properties returned by a property search, updating a list of favorite properties, tracking a status of a property, viewing a status alert regarding a property, accessing a user portfolio, requesting information about a property, submitting a property for sale, viewing a list of offered financial products, viewing a list of offered financial services, applying for a loan, submitting property-for-sale information, submitting property-to-buy information, managing a negotiator portfolio, and monitoring the status of a loan application.

Management of the appointment includes at least one of receiving a request for the appointment, scheduling the appointment, confirming the appointment, and supporting the appointment. For example, the system 8 may support appointments scheduled between users involved in secondary property trading, the status of all appointments may be provided through the online interface on homepages personalized for buyers and negotiators, and buyers and negotiators may be able to contact the customer service function (described in greater detail below) to request and confirm appointments.

Management of the system 8 includes at least one of maintaining at least one of the application architecture and the technical architecture and creating a management report to monitor at least one of an activity of the user, a performance measure, negotiator performance, and customer service performance. For example, management reports can be generated through a backend support tool built on a database application, such as Microsoft Access™.

The application architecture 12 may further include at least one advertising application 28 for enabling an advertiser to advertise an offering to the user. The offering may include at least one of a new product offering, a promotion, and a new project development. For example, all advertising banners, promotions and new projects can be included in the online interface through a backend support tool built on a database application, such as Microsoft Access™.

The technical architecture 14 includes hardware according to a production hardware specification and a technical architecture design. The hardware supports the application architecture 12. The technical architecture 14 can include, for example, at least one server computer running an operating system upon which the application architecture can run. The technical architecture 14 can further include, for example, a web server in operational communication with the server computer and serving web pages that can be accessed by a plurality of client computers over a network, such as the Internet. The web pages serve as an online interface between the application architecture and users operating the client computers to use the applications described above.

Figure 3:
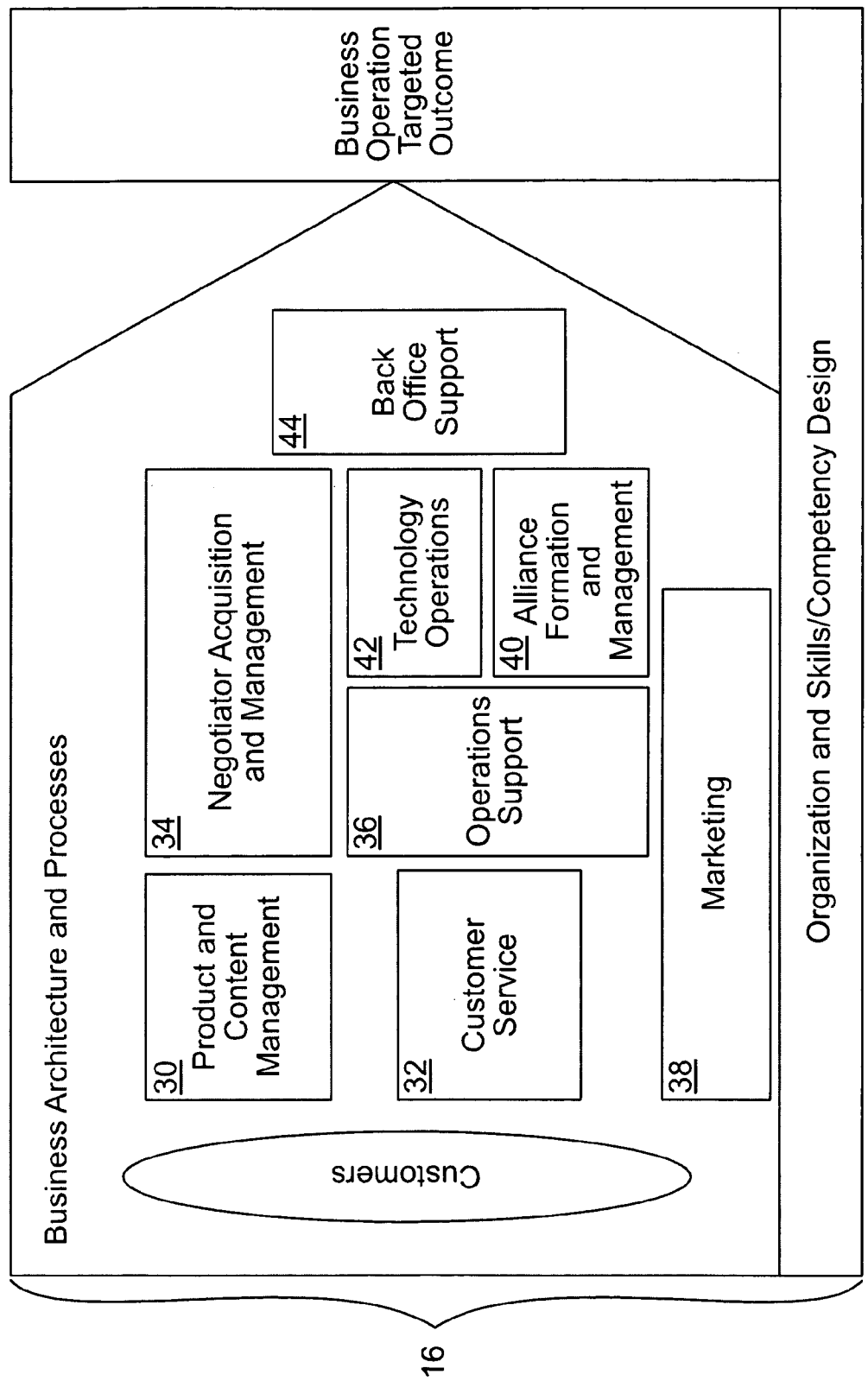
FIG. 3 is a diagram showing an exemplary business operation solution of a system of the invention.

FIG. 3 illustrates an exemplary business operation solution 16 of the system 8 that includes a product and content management function 30, a customer service function 32, a negotiator acquisition and management function 34, an operations support function 36, a marketing function 38, an alliance formation and management function 40, a technology operations function 42, and a back office support function 44. Preferably, each of the functions is independent but interacts with the other functions.

The product and content management function 30 performs at least one of acquiring, developing, enhancing and updating content pertaining to services offered through the system 8, presenting the content through an online interface to a user of the system 8, developing a product offered to the user, and developing a service offered to the user. The content may include at least one of news, financial information, and descriptions of new properties.

The customer service function 32 performs at least one of addressing an inquiry of a user of the system 8, scheduling an appointment for the user to visit a property, maintaining information regarding the user, and providing support to a negotiator assigned to assist in facilitating a transaction involving the user. For example, a 24-hour customer service telephone line is available for registered users for performing tasks such as scheduling an appointment and submitting inquiries.

The negotiator acquisition and management function 34 performs at least one of acquiring a negotiator to assist in the buying and selling of properties, managing the negotiator, meeting an acquisition target of the negotiator, managing a commission due to the negotiator, assigning a property to the negotiator, maintaining a negotiator portfolio, tracking a performance of the negotiator, and training the negotiator.

The operations support function 36 performs at least one of enhancing the customer service function, assisting in processing a bank product application submitted by a user of the system 8 and tracking a status of the bank product application, processing a submission of property-for-sale information by the user, addressing a complaint of the user, collecting feedback from the user, and processing a request for an appointment for the user to visit a property.

The marketing function 38 performs at least one of marketing an online interface of the system 8, and conducting marketing surveys to obtain feedback from a user of the system 8. For example, a marketing team interacts with the product and content management function 30 to provide feedback on users' desires and market conditions.

The alliance formation and management function 40 performs at least one of forming an alliance with a third party to provide a user of the system 8 with services complimentary to services offered through the system 8, and managing the alliance. Preferably, the third party is at least one of a provider of home loans, a property developer, and a provider of legal services to the real estate market.

The technology operations function 42 performs at least one of technologically supporting the functions of the system 8, monitoring and tracking a plurality of interactions between the system 8 and a user of the system 8, monitoring and tracking a plurality of activities by a negotiator assigned to assist in facilitating a transaction involving the user, obtaining and monitoring feedback of the user regarding a third party alliance. For example, a technology team generates user feedback to the negotiator acquisition and management function 34 and the alliance formation and management function 40 regarding users' satisfaction with the alliances.

The back office support function 44 performs at least one of human resource management functions, financial management functions, and administrative management functions.

FIG. 4 illustrates a seller's exemplary interaction with the invention. FIG. 5 illustrates a buyer's exemplary interaction with the invention. FIG. 6 illustrates a negotiator's exemplary interaction with the invention. A method of the invention includes providing to a user of the system 8 an online interface for receiving property-for-sale information from a seller (indicated in FIG. 4 at 45), for publishing the property-for-sale information at an online location through the online interface (indicated in FIG. 4 at 46), and for receiving property-to-buy information from a buyer (indicated in FIG. 5 at 48). The method further includes selecting a property described by the property-for-sale information for recommendation to the buyer using the property-to-buy information (indicated in FIG. 5 at 50), providing the online interface for recommending the property to the buyer (indicated in FIG. 5 at 50), and facilitating a negotiation between the seller and the buyer as necessary to effect a closing of a transaction between the seller and the buyer for the property.

Figure 7:
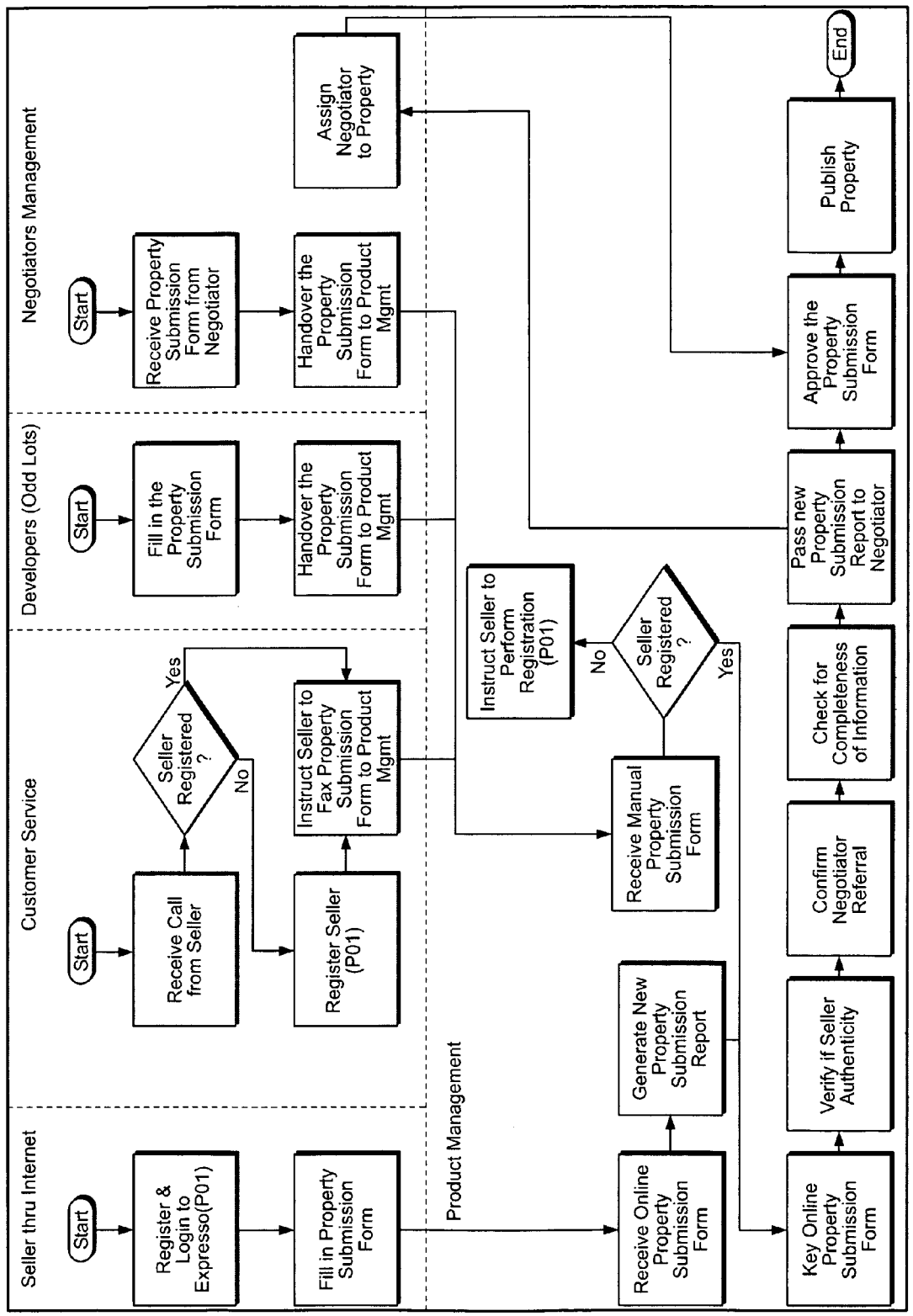
FIG. 7 is a flowchart showing an exemplary property submission method of the invention.

The online interface is, for example, a plurality of web pages served by a web server of the technical architecture 14, and the online location is a location on one of the web pages. The seller is able to enter the property-for-sale information, and the buyer is able to enter the property-to-buy information, by using one of the client computers running a web browser application that can access the web pages over a network, such as the Internet. The transaction applications 22 can select the property for recommendation. FIG. 7 shows an exemplary property submission method of the invention and illustrates that the property-for-sale information can be received from the seller at least one of through the online interface, by facsimile transmission, by hand delivery, and through a third party.

The method further includes reviewing the property-for-sale information (indicated in FIG. 4 at 52), and when the review indicates that the property-for-sale information is incomplete or incorrect, providing the online interface for requesting additional or updated property-for-sale information from the seller (indicated in FIG. 4 at 54). An online interface for publishing the additional or updated property-for-sale information at the online location (indicated in FIG. 4 at 46) is also provided. As shown in exemplary FIG. 7, the product and content management function 30 can review the property-for-sale information and request the additional or updated property-for-sale information from the seller.

A seller portfolio is established that can be accessed by the seller online to view the published property-for-sale information and monitor a progress status of the transaction (indicated in FIG. 4 at 56). The seller portfolio may include at least one of information regarding a duration of a posting of the property, information regarding a number of hits received by a website containing information about the property, information regarding a status of a sale of the property and information regarding a status of a rental of the property.

Figure 8A:
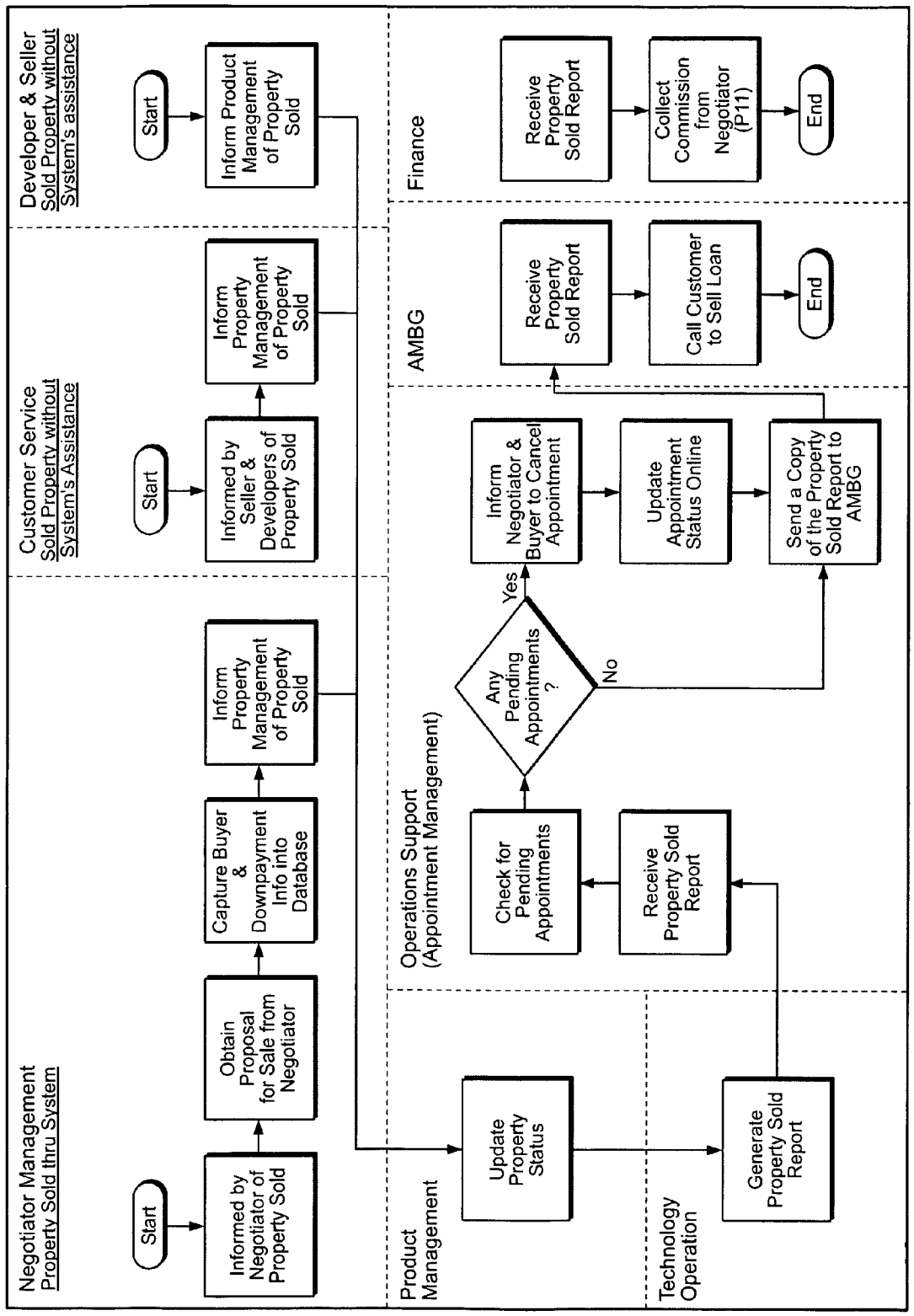
FIG. 8a is a flowchart showing an exemplary property management method of the invention.

At 58 in FIGS. 4 and 5, the published property-for-sale information is updated after the closing to reflect that the property has been sold, the property-for-sale information is removed from the online location after the closing, and, after the closing, a pending appointment for a second buyer to visit the property is canceled. FIG. 8*a* shows an exemplary property addition and maintenance method of the invention and illustrates that the product and content management function 30 can update the property status when informed of a sale of the property by the negotiator acquisition and management function 34, the customer service function 32, or the seller. The product and content management function 30 then informs the technology operations function 42 which in turn generates a property sold report to the operations support function 36. The operations support function 36 then cancels any pending appointments and updates the appointment status on the online interface.

Figure 8B:
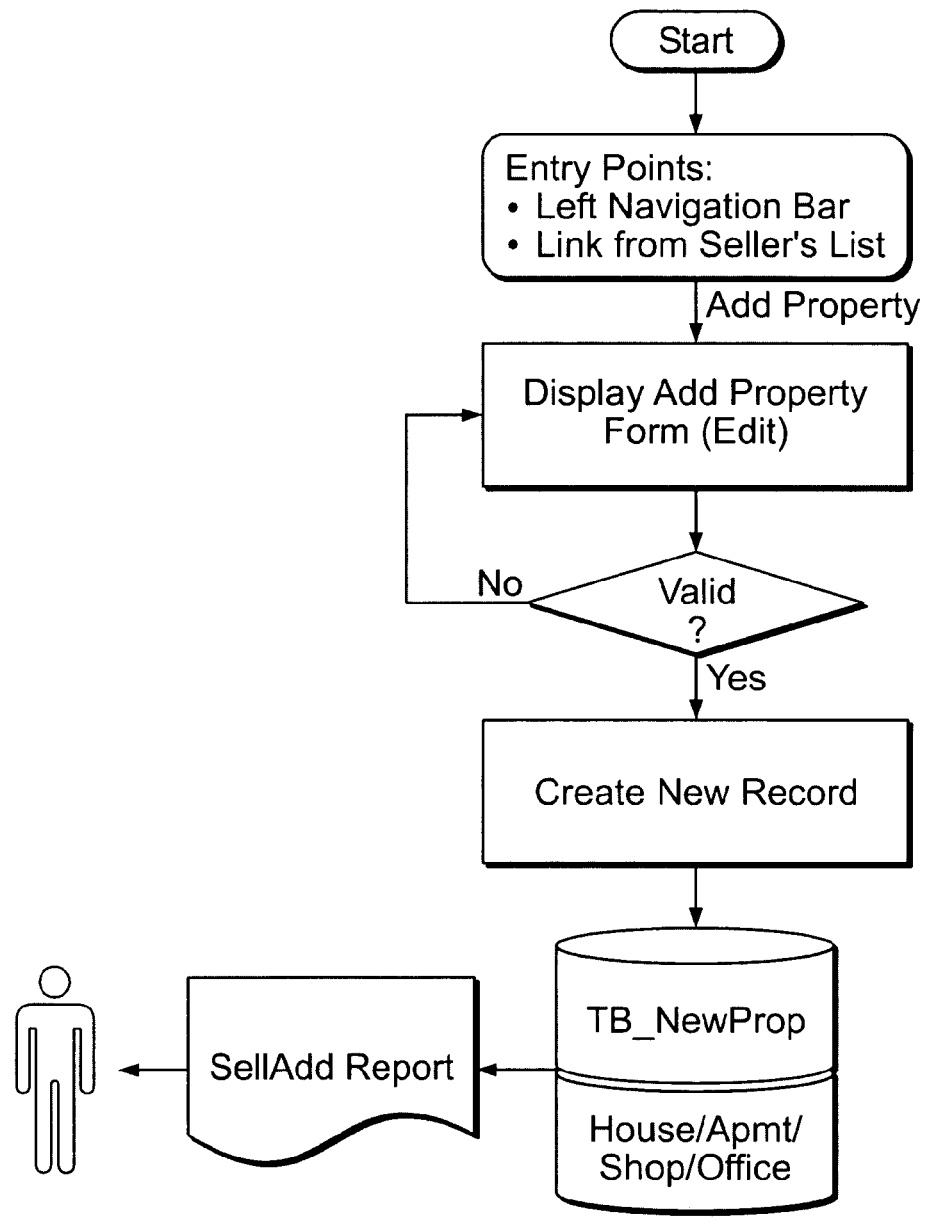
FIGS. 8b and 8c are flowcharts showing an exemplary property addition and maintenance method of the invention.
Figure 8C:
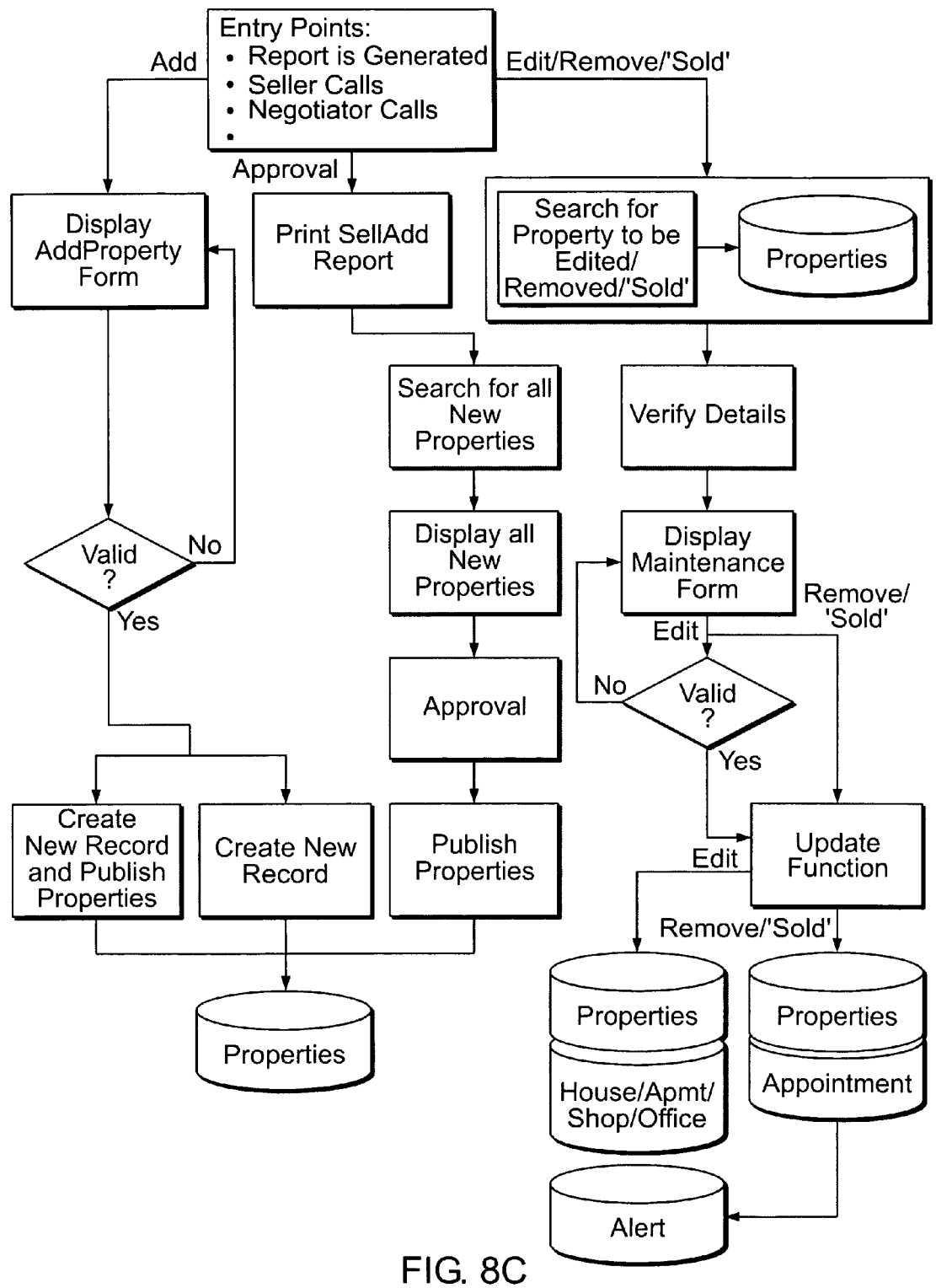

Exemplary FIGS. 8*b* and 8*c* illustrate one embodiment by which sellers are able to add new property-for-sale information for publishing, edit published property-for-sale information and remove published property-for-sale information (for reasons other than being sold), and by which the operations support function 36 categorizes properties as sold (for removal due to being sold). The method of the invention may be adapted for use with the online interface, such that, as indicated in FIG. 8*b*, the seller is able to access a Hypertext Transfer Protocol ("HTTP")-based AddProperty Form by way of a hyperlink located on a navigation bar on a web page of the online interface, or in a seller's activity list on a web page of the online interface.

For example, when adding new property-for sale information, the AddProperty Form is displayed in an edit mode when a navigation bar on a web page of the online interface is clicked, or when a hyperlink in the seller's activity list is clicked. The seller completes the applicable form fields and selects applicable parameters. The operations support function then checks the form for validation. If the validation is negative, the AddProperty Form is displayed again with red asterisks showing the errors and the seller is asked to enter correct information. If the validation is positive, a new record is created. The new record is not published, but is saved under "new" status pending approval by the operations support function. A properties table is updated with the information from the AddProperty Form. An AddProperty report including the same fields as the AddProperty Form is generated online or via batch processing.

For each property type, the AddProperty Form includes, for example, property type, unit type, sell/rent/both option, selling price, rental amount, address (e.g., free form), postcode, and actual built-up area (e.g., sq. ft.). In addition, the AddProperty Form may include a submit button, a reset button and a previous button with associated functions for the convenience of the user. For each property type, the AddProperty Form also includes, as optional fields, age, renovation description, furnishing description, corner unit indicator, number of bedrooms—up/down, number of bathrooms—up/down, number of stories, referral, free form description of property, total land-area, width of property, length of property, width of master bedroom, length of master bedroom, width of first bedroom, length of first bedroom, width of second bedroom, length of second bedroom, width of third bedroom, length of third bedroom, width of living room, length of living room, width of dining room, length of dining room, width of kitchen, length of kitchen, width of garden, length of garden, land tenor type, leasehold duration, high/low rise, apartment/condo facilities description, and apartment/condo view. If the user does not have a referral name, the referral field is defaulted to "select one", and a negotiator is assigned by the operations support function using a commission-sharing formula.

The operations support function 36 becomes involved in the method, as indicated in FIG. 8c, when an AddProperty Report is generated, when a seller calls, or when a negotiator calls. For example, when adding a property received via phone call to the operations support function 36, the AddProperty Form is displayed in edit mode. The applicable form fields are completed and the applicable parameters are selected by the operations support function 36 using information provided by the seller over the phone. The operations support function 36 then checks the form for validation. If the validation is negative, the AddProperty Form is displayed again with red asterisks showing the errors, and the operations support function 36 asks the seller for corrected information and completes the form with the corrected information. If the validation is positive, a new record is created, and the operations support function 36 saves the record under "new" status pending approval or publishes the record. The Properties Table is updated with the information from the AddProperty Form.

When approving a property, for example, the operations support function 36 first searches for properties that have been assigned a "new" status. Once the new properties are displayed on the search results page, the property details are checked by the operations support function 36. If the property details are accurate, the operations support function 36 approves and publishes the properties, updates the Property Table, and changes the statuses from "new" to "available".

When editing a property, removing a property and/or categorizing a property as 'sold', for example, a search function accessed by clicking an appropriate search hyperlink on a navigation bar is first used to extract relevant properties from the Properties Table using a Property ID and a User ID. The relevant properties are displayed on a search results page, and an HTML-based Maintain Property Form is displayed. The Maintain Property Form is used for editing and removing properties and includes the same fields as the AddProperty Form, but also includes Property ID and User ID fields, as well as a submit button and a cancel button with associated functions.

After editing a property, the new information is checked for validation by the operations support function 36. If the validation is negative, the Maintain Property Form is displayed again with an indication, such as red asterisks, showing the errors and the seller is asked to enter correct information. If the validation is positive, the function is updated in the properties table.

After removing a property and/or categorizing a property as "sold", for example, a message box confirming the removal and a "sold" alert are displayed. If the confirmation is negative, the Maintain Property Form is displayed again an indication, such as red asterisks, showing the errors and the seller is asked to enter correct information. If the confirmation is positive, the function is updated in the properties table. The statuses of the properties are changed from "available" to "expire". Once the statuses are changed to "expire", the associated properties are not available for search purposes. In addition, after removing a property and/or categorizing a property as "sold", for example, both the properties table and the appointment table are updated. Using the appointment table, appointments for visiting that particular property are retrieved and canceled, for example, by phone.

The online interface can also enable the buyer to conduct a search for and view the published property-for-sale information (indicated in FIG. 5 at 48). The online interface provides at least one of a manual search interface, a profile search interface, a personalized search interface, and a list of properties matching criteria of the search. The online interface can also enable the buyer to maintain at least one of a list of favorite properties and a record of previous search parameters. Preferably, the online interface also enables the buyer to monitor a progress status of the transaction (indicated in FIG. 5 at 59).

Figure 9A:
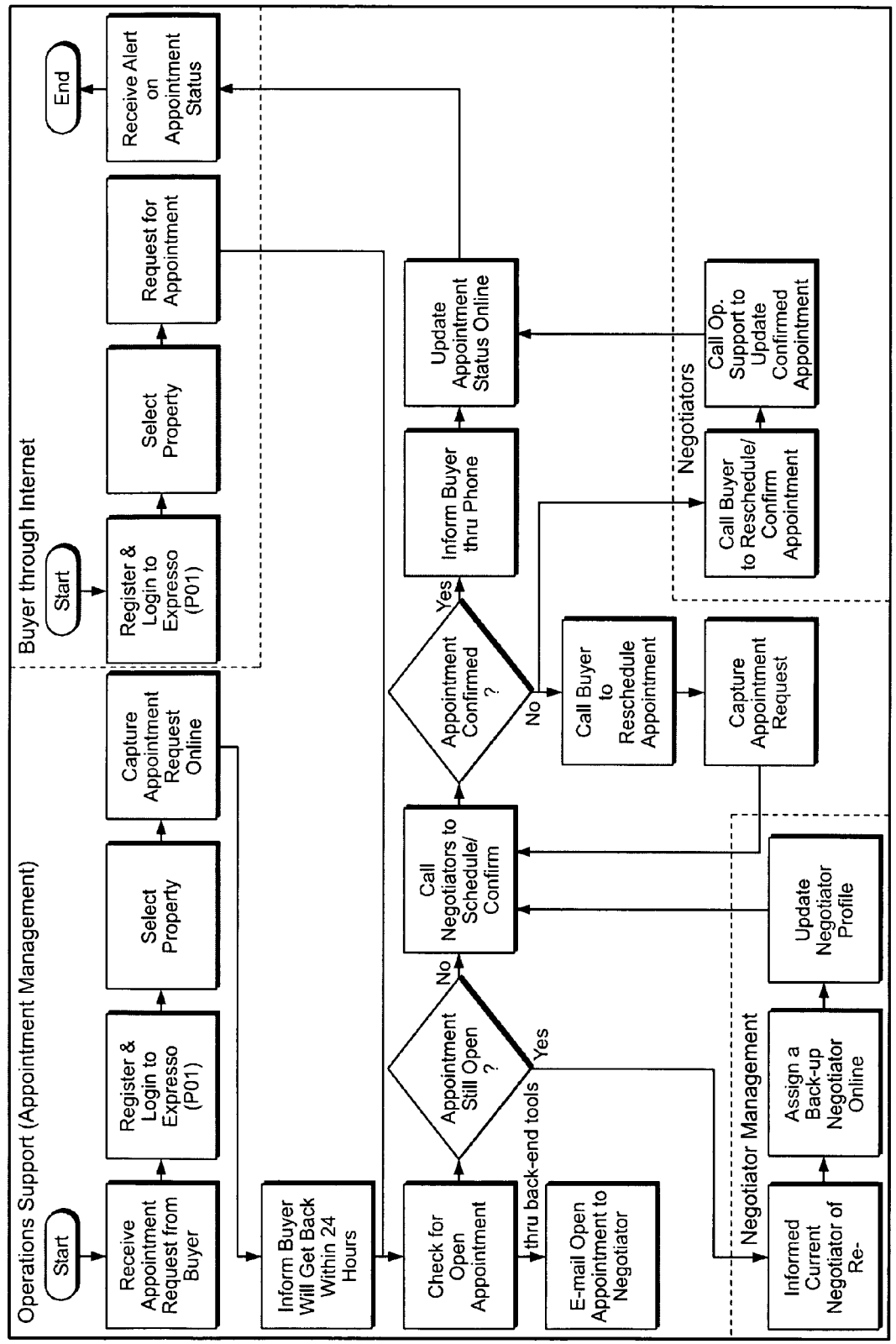
FIGS. 9a and 9b are flowcharts showing an exemplary appointment request and confirmation method and an exemplary appointment cancellation method of the invention.

FIG. 9a shows an exemplary appointment request and confirmation method of the invention. Scheduling an appointment for the buyer to visit the property occurs at 60, assigning a negotiator to accompany the buyer during the visit occurs at 61 and confirming the appointment with the negotiator and the buyer occurs at 62. The buyer may also track a status of the appointment. The online interface can enable the buyer to schedule the appointment online and monitor the status at 64. The invention also contemplates a call center that is provided for confirming the appointment with the buyer using a phone, and enabling the buyer to schedule the appointment using the phone (indicated in FIG. 5 at 66). As shown in exemplary FIG. 9a, the operations support function 36 receives an appointment schedule request from a buyer, schedules the appointment, assigns a negotiator, confirms the appointment and tracks a status of the appointment.

Figure 9B:
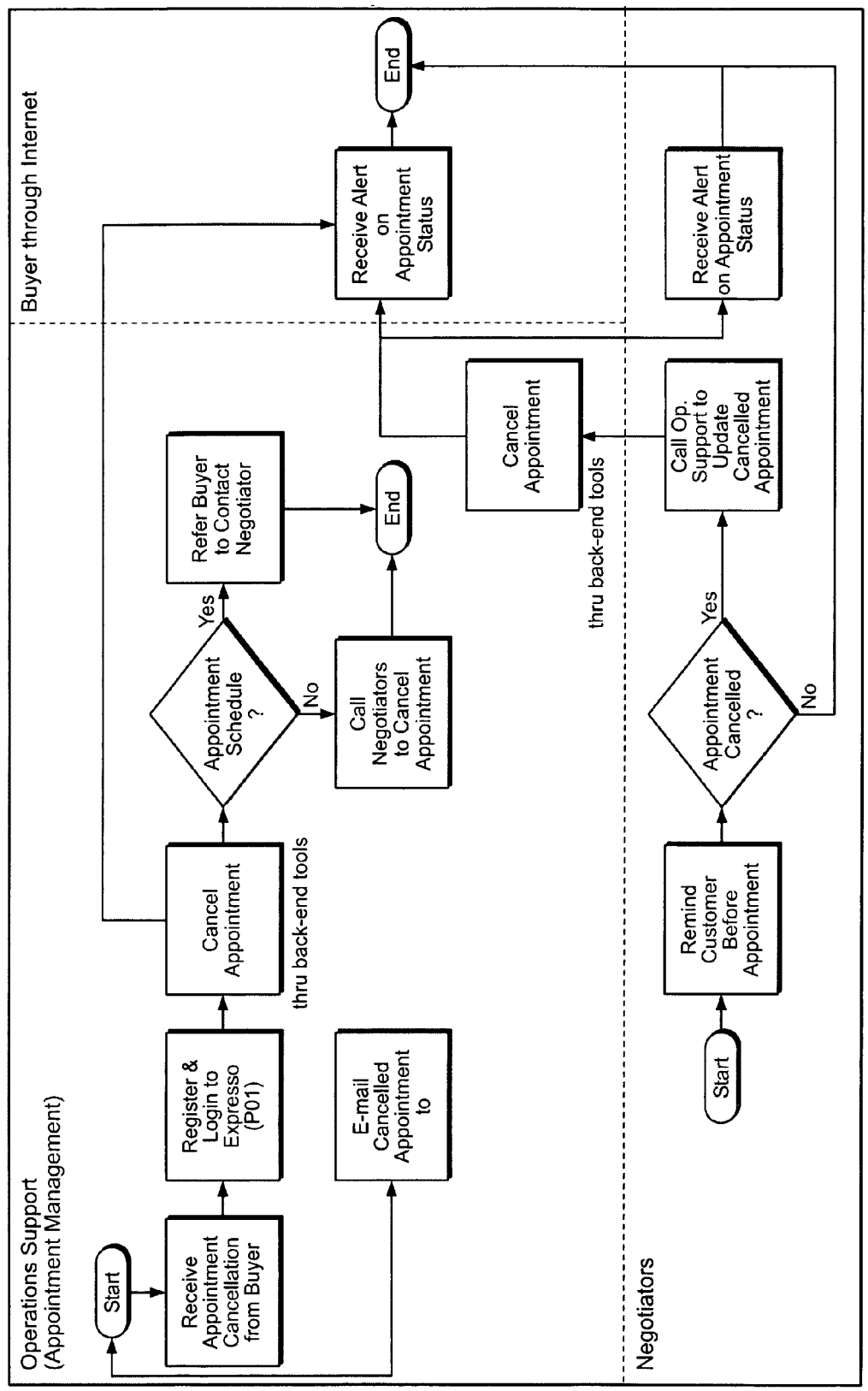

FIG. 9b shows an exemplary appointment cancellation method of the invention in which an appointment is scheduled for the buyer to visit the property, an appointment cancellation request is received from the buyer, the appointment is canceled, and the online interface is provided for informing the buyer of the cancellation. A negotiator can be assigned to accompany the buyer during the visit, and the negotiator can be informed of the appointment cancellation request. As shown in exemplary FIG. 9b, the operations support function 36 receives an appointment cancellation request, cancels the appointment, and informs the buyer and the negotiator of the cancellation through the online interface.

As shown in exemplary FIGS. 9a and 9b, the method further includes assigning a negotiator to assist in the facilitation 70, managing and confirming an appointment requested by the buyer to visit the property 72, and communicating with at least one of the seller and the buyer about a progress status of the transaction 74. For example, the operations support function 36 assigns the negotiator, manages and confirms an appointment requested by the buyer to visit the property, and communicates with the seller and/or the buyer about a progress status of the transaction. The assigned negotiator may also manage and confirm the appointment and communicate the progress status of the transaction to the seller and/or the buyer.

Figure 10:
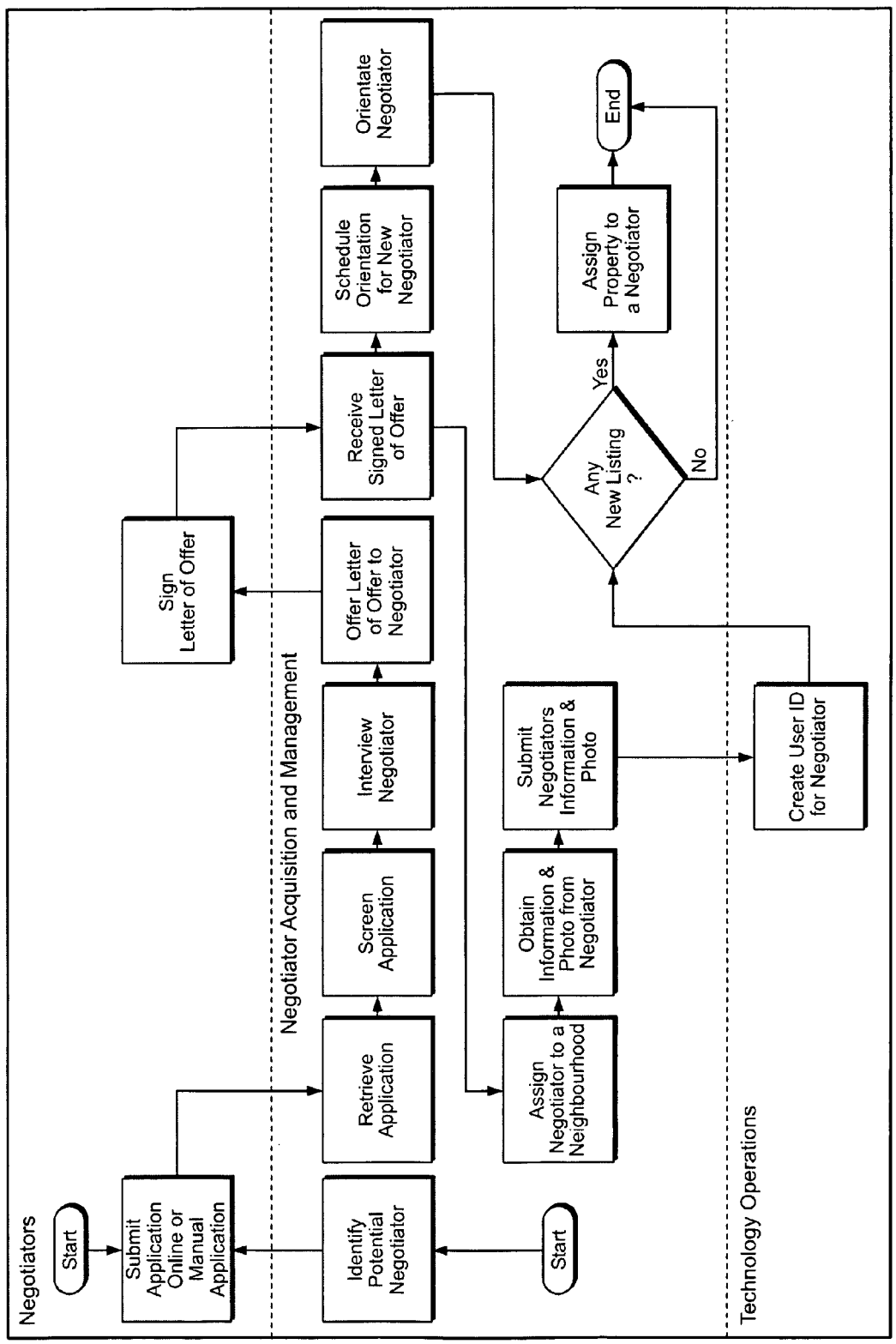
FIG. 10 is a flowchart showing an exemplary negotiator acquisition method of the invention.

FIG. 10 shows an exemplary negotiator acquisition method of the invention that includes, prior to assigning the negotiator, receiving an application from the negotiator to be paid for negotiation services, evaluating the negotiator, presenting an offer to the negotiator to be paid for negotiation services, and receiving an acceptance of the offer from the negotiator. The online interface may inform the negotiator that the negotiator has been assigned at 76 and confirm the appointment with the negotiator, informing the negotiator of a time of the appointment, and enabling the negotiator to view details of the appointment. For example, the negotiator acquisition and management function 34 performs these functions with the assistance of the technology operations function 42.

Figure 11:
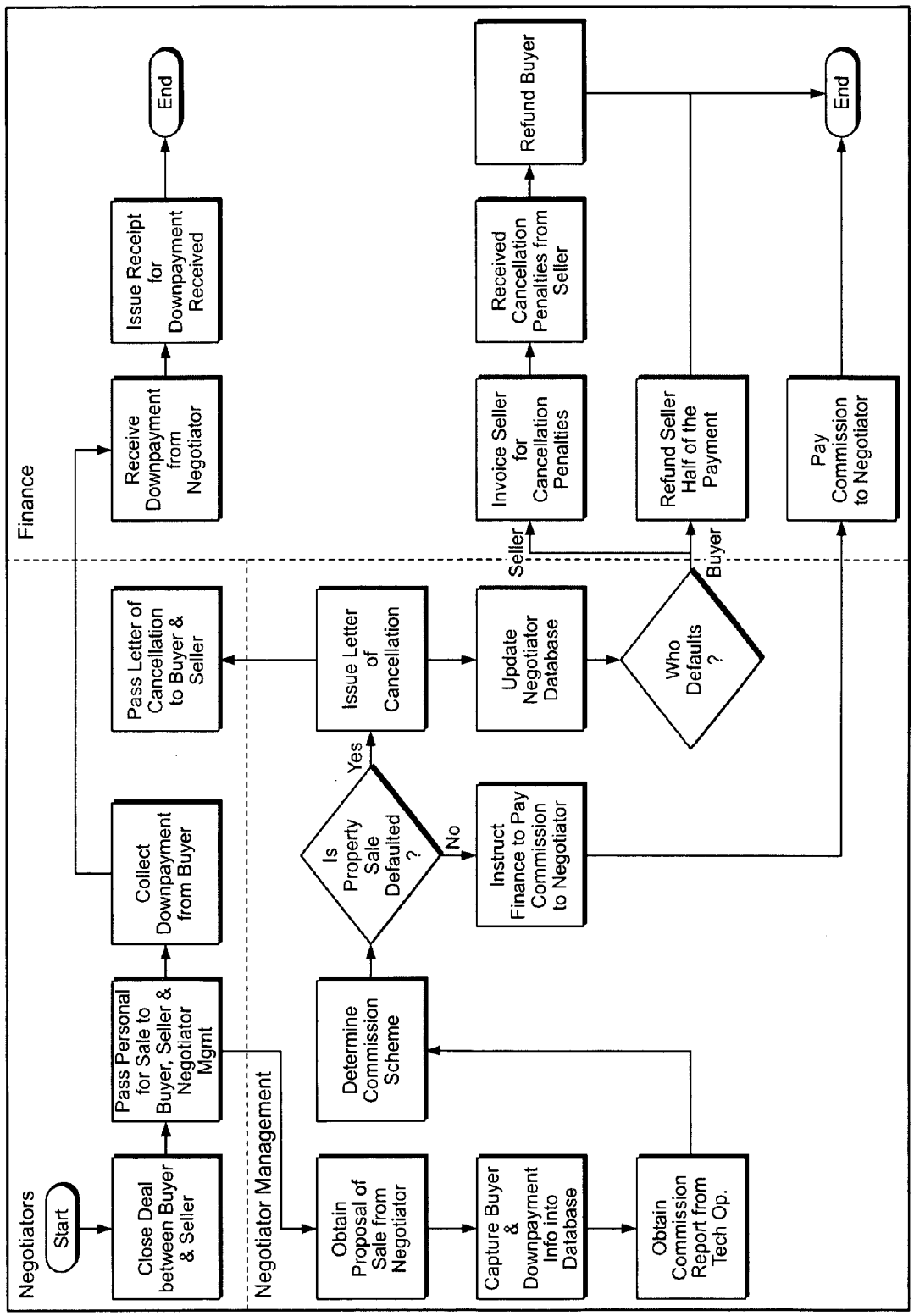
FIG. 11 is a flowchart showing an exemplary commission management method of the invention.

FIG. 11 shows an exemplary commission management method of the invention that includes establishing a negotiator portfolio 78, providing the online interface for enabling the negotiator to monitor the progress status of a transaction 79, supporting the negotiator during the facilitation and during the closing 80, and monitoring and tracking a commission to be paid to the negotiator 82. After closing, proposed sale terms are received from the negotiator, the commission is determined based on the proposed sale terms, and the commission is paid to the negotiator. The method of the invention may also include, after the closing, determining whether there has been a default by at least one of the seller and the buyer, and, when there has been a default, canceling the transaction, determining whether a defaulting party is the seller or the buyer, and assessing a cancellation penalty to the defaulting party. For example, the negotiator acquisition and management function 34 performs these functions with the assistance of the back office support function 44.

Figure 12:
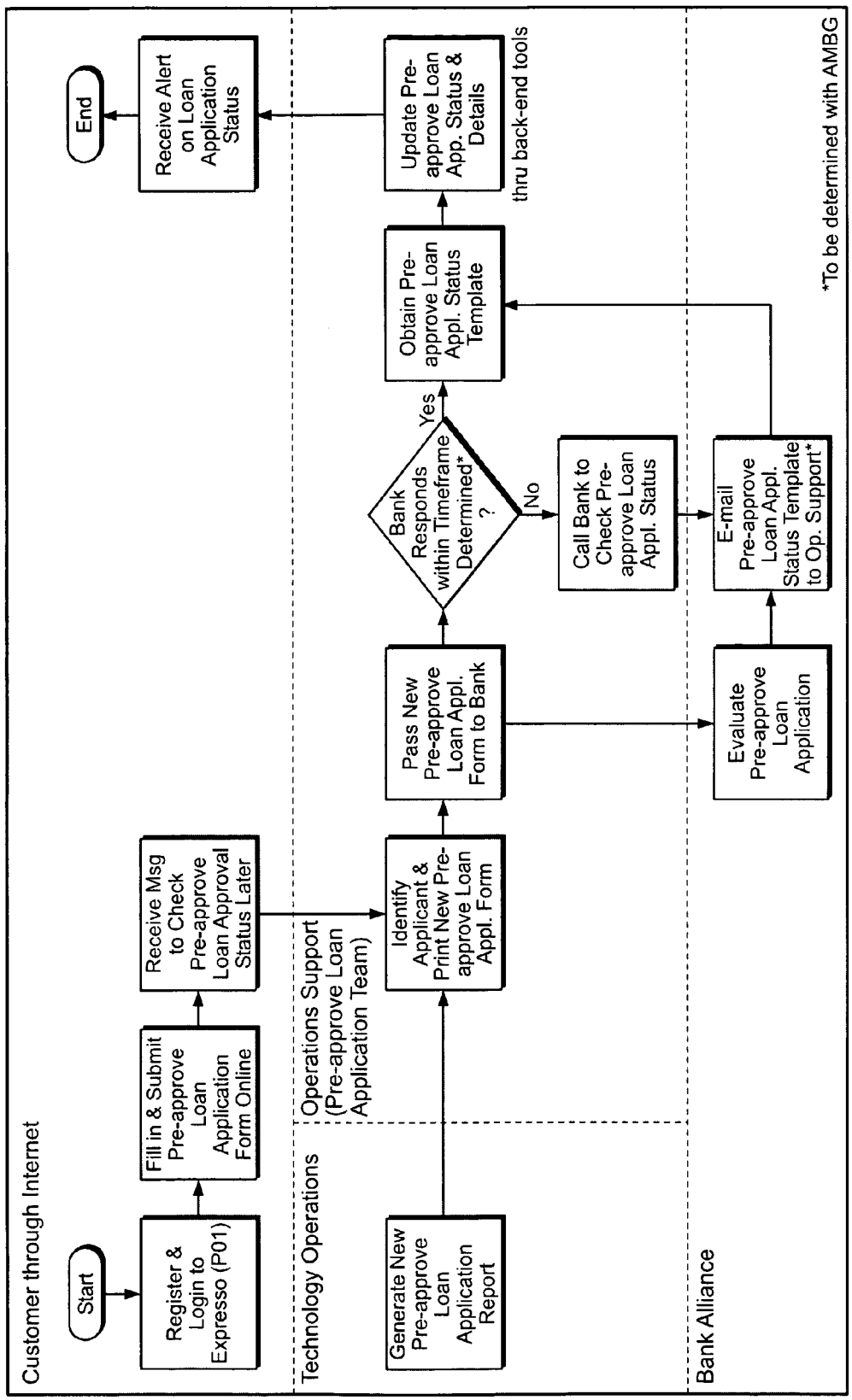
FIG. 12 is a flowchart showing an exemplary pre-approved loan application method of the invention.

FIG. 12 shows an exemplary pre-approved loan application method of the invention and illustrates that the method of the invention further includes providing the online interface for enabling the buyer to provide application information for a bank product, forwarding the bank product application information to a bank, communicating with the bank regarding an application established using the bank product application information, monitoring a status of the application, providing the online interface for reporting the status to the buyer and enabling the buyer to monitor the status, and confirming an approval of the application with the buyer when the application is approved (indicated in FIG. 5 at 84, 86, 88 and 90). The bank product may be a pre-approved home loan or non-pre-approved home loan. For example, the buyer uses the online interface to submit pre-approved loan application information to the operations support function 36, which then forwards the application information to a bank, communicates with the bank regarding the application, monitors a status of the application, reports the status to the buyer through the online interface, and confirms the loan approval through the online interface.

The method of the invention may further include providing the online interface for enabling the buyer to search for a home furnishing, providing a recommendation regarding the home furnishing (indicated in FIG. 5 at 92), and providing the online interface for enabling at least one of the seller and the buyer to use a real estate transaction tool.

Figure 13:
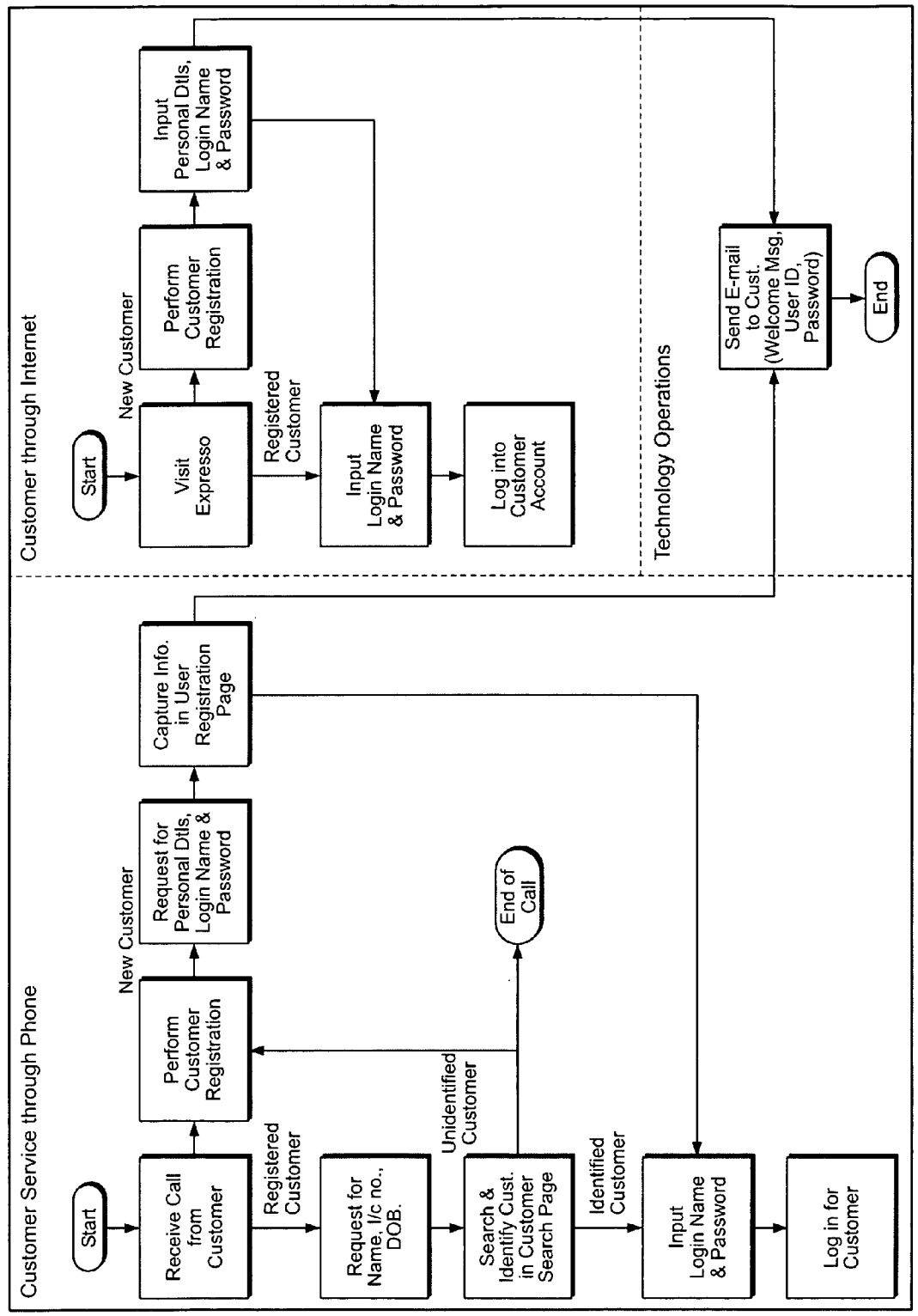
FIG. 13 is a flowchart showing an exemplary customer registration and login method of the invention.

FIG. 13 shows an exemplary customer registration and login method of the invention and illustrates that the method of the invention further includes providing the online interface for registering the seller prior to receiving the property-for-sale information from the seller, assisting the seller with the seller registration when necessary, providing the online interface for registering the buyer prior to receiving the property-to-buy information from the buyer, and assisting the buyer with the buyer registration when necessary. At least one of assisting the seller and assisting the buyer can be performed over a phone connection. The online interface may be used for obtaining personal information of at least one of the seller and the buyer, and updating the personal information when necessary. The personal information can be at least one of personal financial information and property search preferences. For example, the customer service function 32 performs these functions with the assistance of the technology operations function 42.

Figure 14A:
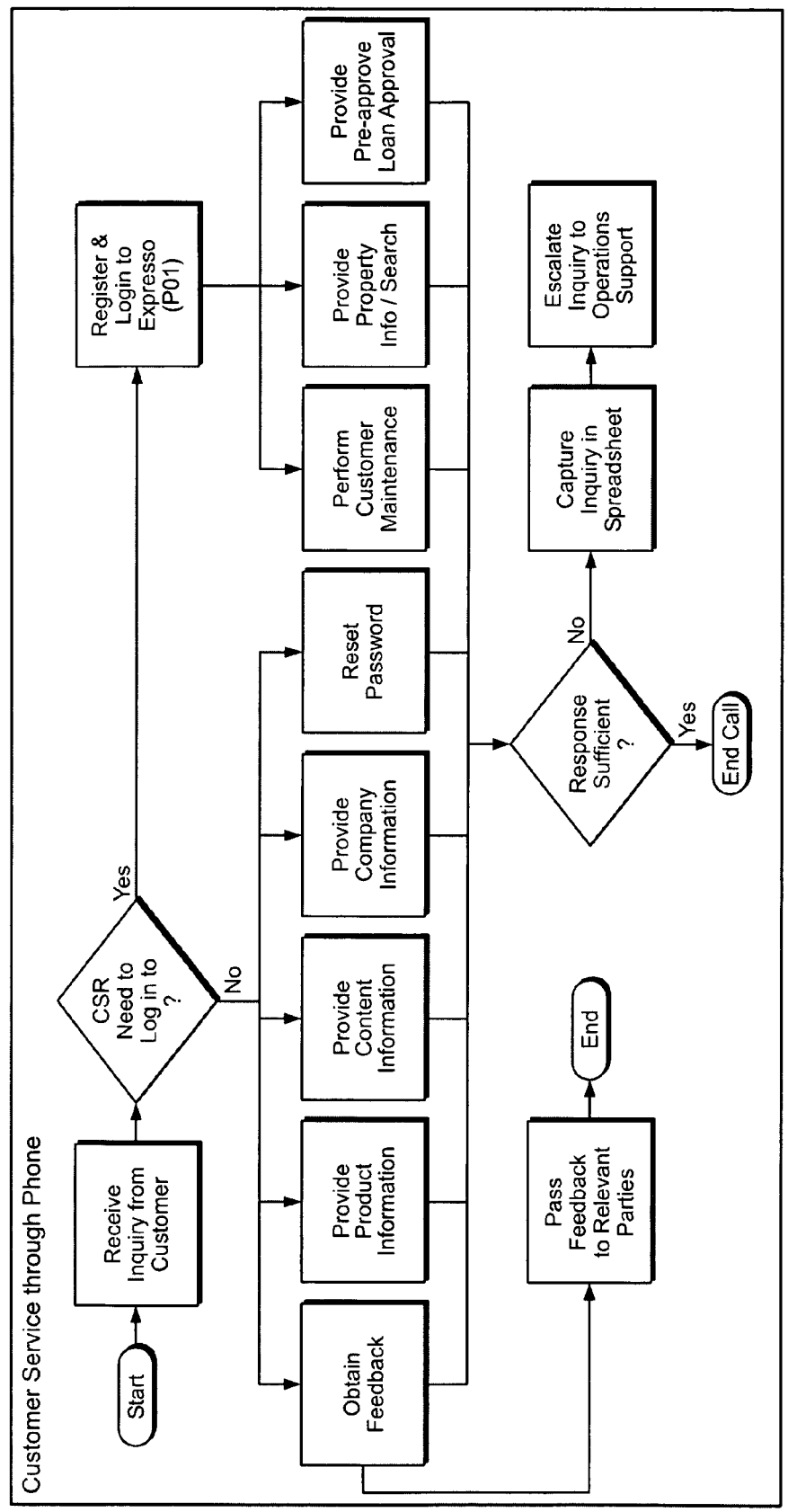
FIGS. 14a and 14b are flowcharts showing an exemplary inquiry to customer service method and an exemplary inquiry to operations support method of the invention.
Figure 14B:
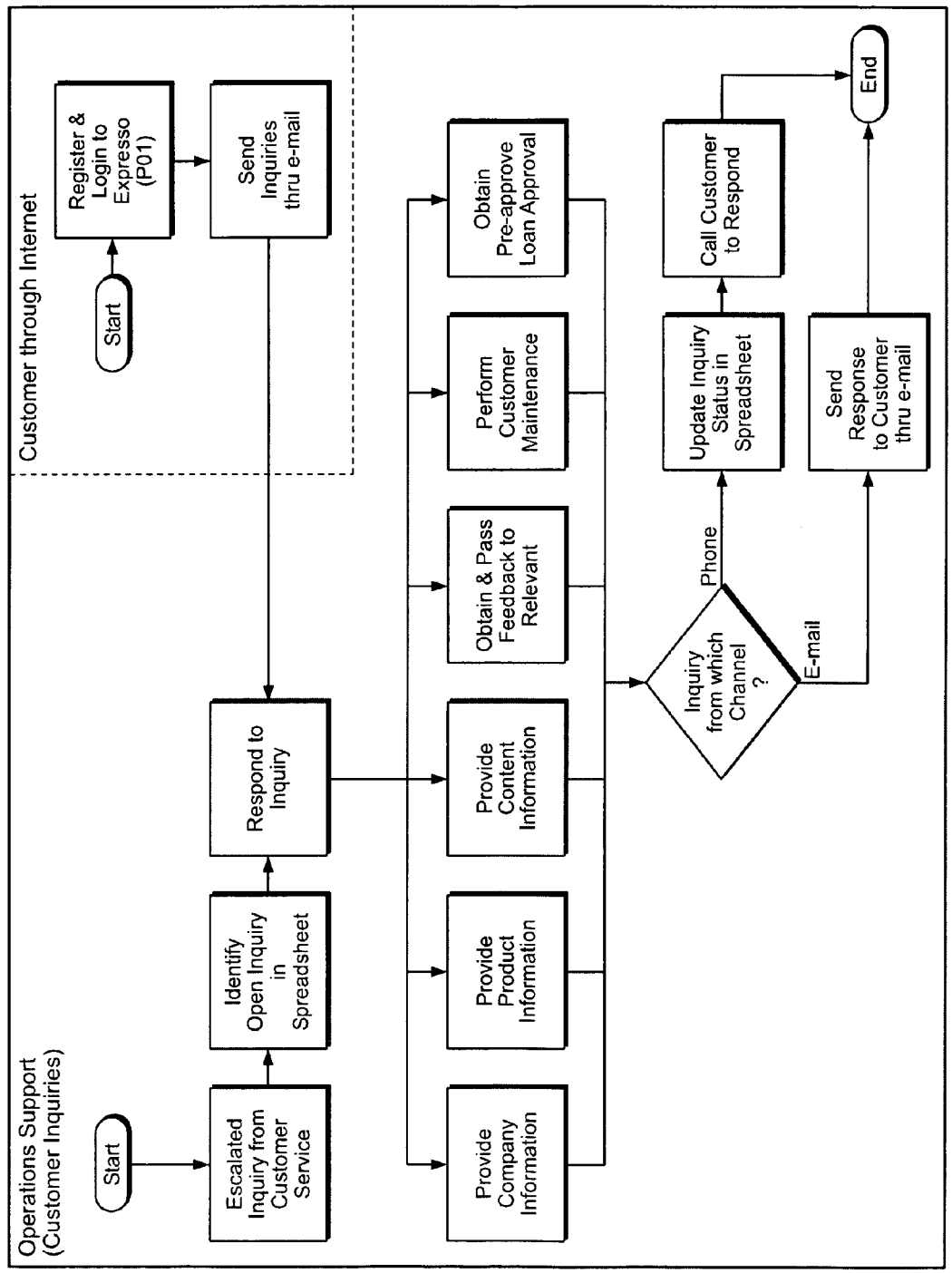

FIGS. 14a and 14b show an exemplary inquiry to customer service method and an exemplary inquiry to operations support method of the invention that include receiving a customer service request from one of the seller and the buyer, and addressing the customer service request. The customer service request can be received over a phone connection. The customer service request can be addressed by forwarding the customer service request to a customer inquiries team. For example, the customer service function 32 performs these functions.

Figure 15A:
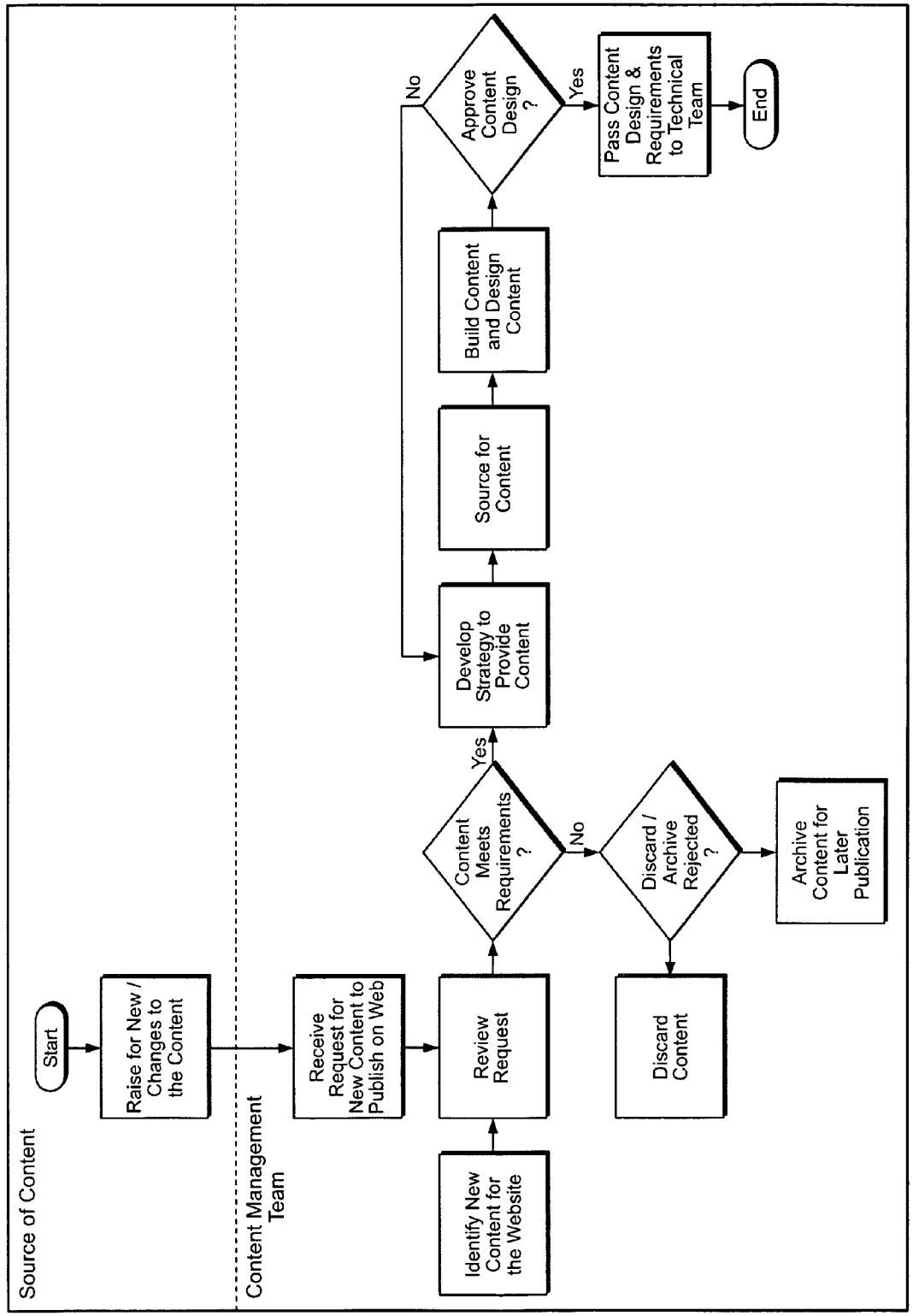
FIGS. 15a and 15b are flowcharts showing an exemplary content preparation and approval method and an exemplary content development and archiving method of the invention.
Figure 15B:
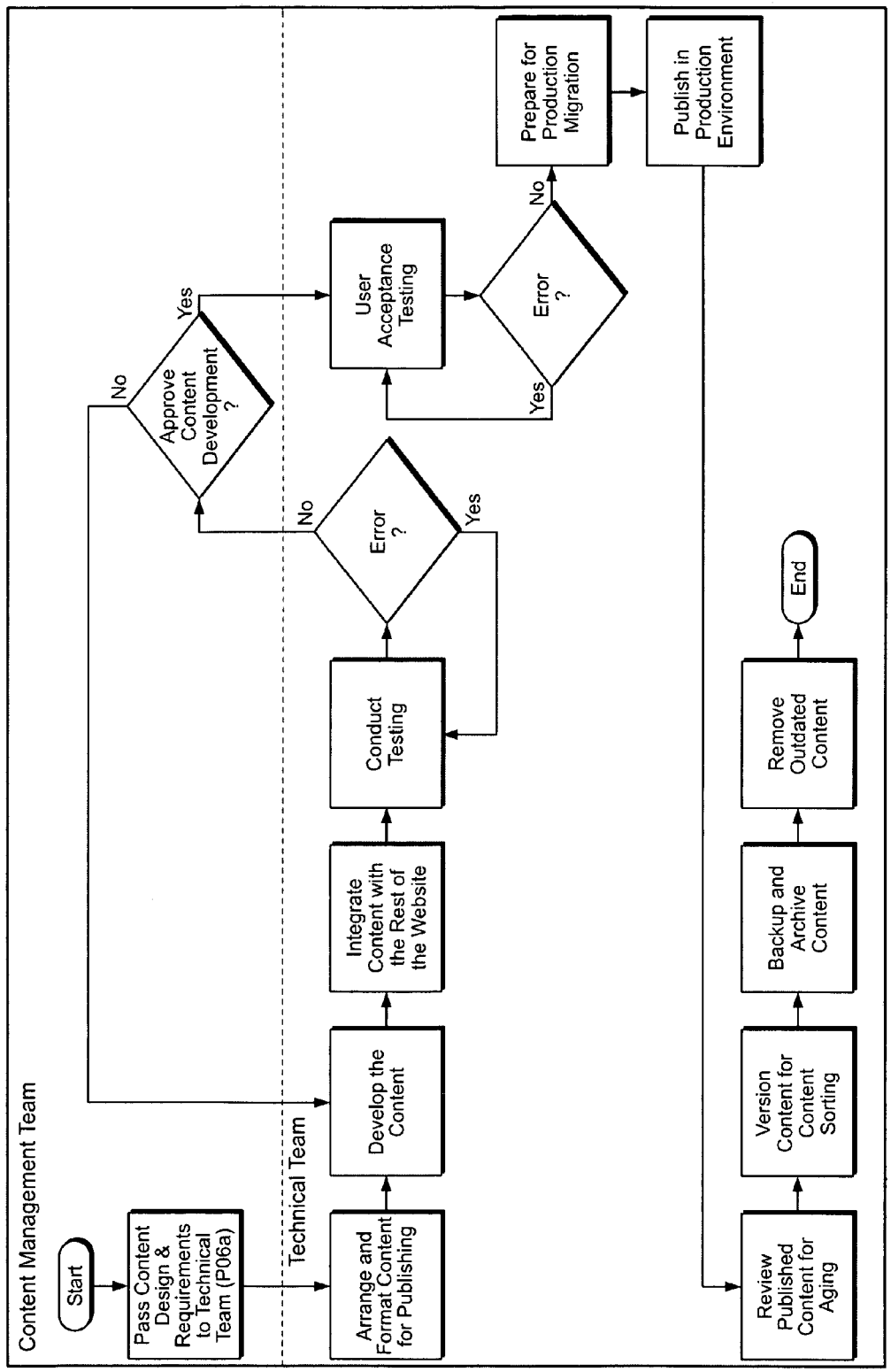

FIGS. 15a and 15b show an exemplary content preparation and approval method and an exemplary content development and archiving method of the invention that include providing the online interface for publishing real estate-related content to the seller or the buyer. The real estate-related content can be at least one of a property buying guide, a property rental guide, a glossary of real estate terms, advice on buying and renting properties, personalized neighborhood advice, real estate news, property news, a personalized property recommendation, promotion information regarding a third party alliance, information regarding real estate-related products and services, a personalized promotion, and a list of frequently asked questions and respective answers. The method of the invention may further include receiving a request for a provider of the content to have the content published through the online interface, reviewing the content, approving the content for publishing when the review indicates that the content is appropriate for publishing, and publishing the content through the online interface. The method of the invention may further include arranging and formatting the content for publishing, integrating the content with previously published content, and testing the integration. The method of the invention may further include, after publishing the content, reviewing the content to determine if the content is outdated, and, when the review indicates the content is outdated, archiving the content, and removing the content from publication. For example, the product and content management function 30 performs these functions.

Figure 16:
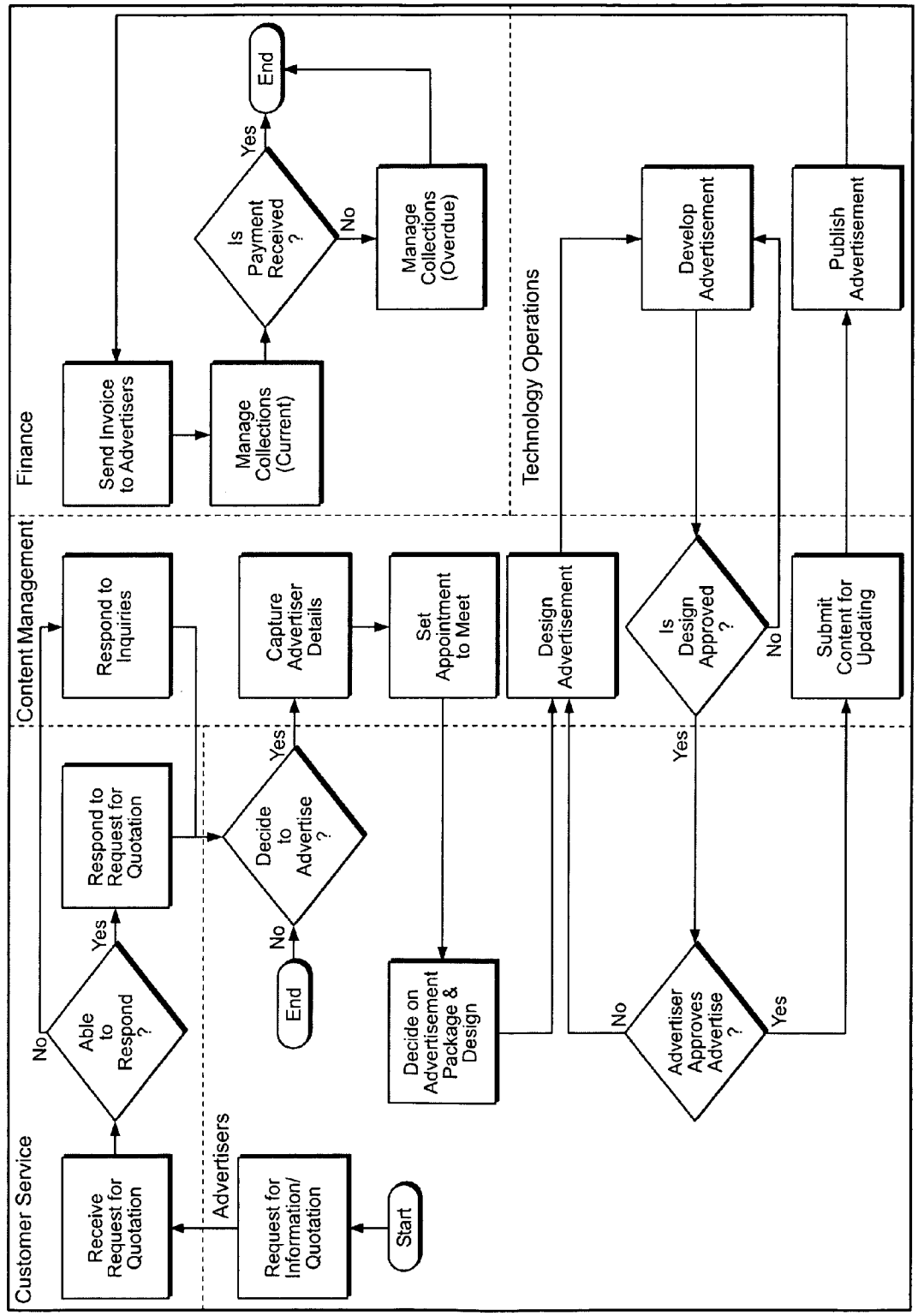
FIG. 16 is a flowchart showing an exemplary content management method of the invention.

FIG. 16 shows an exemplary content management method of the invention that includes providing the online interface for publishing an advertisement to the seller or the buyer, receiving a request for an advertiser to have the advertisement published through the online interface, working with the advertiser to develop or design the advertisement as necessary, and publishing the advertisement through the online interface. The method of the invention may further include, after publishing the advertisement, collecting an advertising fee from the advertiser. For example, the product and content management function 30 performs these functions with the assistance of the technology operations function 42.

A buyer profile may be established and a property may be selected for recommendation to the buyer using information in the buyer profile. Similarly, a seller profile may be established and information in the seller profile may be used to recommend to the seller that the seller sell a property.

FIG. 17 shows an exemplary character profiling method of the invention that includes defining a plurality of character types at 94, defining a plurality of character attributes divided into character attribute subsets at 94, defining a character profile matrix representing the likelihood that a person of at least one of the character types will fit into at least one of the character attribute subsets at 94, assigning a character profile score to a user using the character profile matrix at 96, the user being a seller or a buyer, and providing at least one of a customized recommendation and a customized opinion to the user based on the character profile score at 98. The user may be the seller and the customized recommendation may be a recommendation to sell a property. The user may be the buyer and the customized recommendation may be a recommendation to buy a property.

Users can be assigned a character profile without user intervention. Once a user registers with the system 8 through the online interface, a session can be created for the user based on the user's character profile. A personalized "home page" can be created and presented to the user based on the user's character profile. This enables the system 8 to provide unique customized recommendations and opinions to help the user find a home to buy or sell.

Distinct character types may be defined to represent different categories of users of the system 8. FIGS. 18a–18c illustrate exemplary predefined character types according to a method of the invention. As shown in FIG. 18a, the character types may include at least one of yuppie, expatriate, young: family, established family, teenager, elderly, and none. Each of these character types has distinct attributes and pre-defined lifestyles that the system 8 uses to define the character types. As shown in FIG. 18b, the character attributes may include at least one of age, income range, marital status, number of children, and nationality. Each character attribute can be further classified into character attribute subsets. As shown in FIG. 18c, the attribute "age" can be classified into age groups (such as 20–30 years old, 30–40 years old, etc.) and the attribute "income range" can be classified into range groups (such as $0; <$50,000; $51,000><$100,000; etc.). After determining the character attribute subsets within each character attribute, the character profile matrix can be defined and used to map the likeliness of each character type to fit the character attribute subsets. As shown in FIG. 18c, a total of 100 points is distributed to each age group classification based on the likeness of each character type to fit the age group. For example, a 25-year-old user most likely will fit 80% into the "yuppie" character type, 10% into the "expatriate" character type, and 10% into the "young family" character type. As described below, the character profile matrix can be dynamic and improved over time as the system 8 retrieves market survey feedback and monitors user habits within each of the character type.

FIG. 19a shows an exemplary questionnaire used in a method of the invention. FIG. 19b shows exemplary data obtained by a character profiling method of the invention. FIGS. 19c–19g illustrate determinations of a demographic weightage, a neighborhood weightage, a property type weightage, a property weightage, and a character profile score according to respective methods of the invention.

As shown in FIG. 19a, assigning the character profile score can include receiving questionnaire answers from the user. As shown in FIGS. 19b–19f, the questionnaire answers can be used to map the user in the character profile matrix. As shown in FIG. 9g, the mapping can be used to calculate the character profile score. The questionnaire answers may include demographic data, preferred neighborhood data and preferred property type data. For example, when a user registers with the system 8, the user is assigned a character profile score based on the registration data and answers provided by the user to a series of questions. The user registration procedure may require the potential buyer, seller, or negotiator to complete a registration form, and enable the system 8 to obtain and track relevant demographic data (e.g., date of birth, marital status, number of children, etc.) that is used to profile the user. As shown in exemplary FIGS. 19a and 19b, after the registration process, the user may be asked to complete a questionnaire regarding the user's attributes and lifestyle that enables the system 8 to obtain and track relevant real estate preferences (e.g., preferred property neighborhood and preferred type of property).

Mapping the user in the character profile matrix may include passing the demographic data through a demographic matrix of the character profile matrix to calculate a demographic weightage indicating the relative degree of demographic similarity of the user to each of the character types. For example, as shown in exemplary FIG. 19c, the demographic matrix contains the demographic points assigned to each predefined character type, the weightage of each demographic data item is multiplied by the demographic points to calculate demographic attribute values for the user, and the demographic attribute values are added to determine the demographic weightage.

Mapping the user in the character profile matrix may further include passing the preferred neighborhood data through a neighborhood matrix of the character profile matrix to calculate a neighborhood weightage indicating the relative degree of neighborhood preference similarity of the user to each of the character types. For example, as shown in exemplary FIG. 19d, the neighborhood matrix contains the preferred neighborhood points assigned to each predefined character type, the weightage of each preferred neighborhood data item is multiplied by the preferred neighborhood points to calculate preferred neighborhood attribute values for the user, and the preferred neighborhood attribute values are added to determine the neighborhood weightage.

Mapping the user in the character profile matrix may further include passing the preferred property type data through a property type matrix of the character profile matrix to calculate a property type weightage indicating the relative degree of property type preference similarity of the user to each of the character types. For example, as shown in exemplary FIG. 19e, the property type matrix contains the preferred property type points assigned to each predefined character type, the weightage of each preferred property type data item is multiplied by the preferred property type points to calculate preferred property type attribute values for the user, and the preferred property type attribute values are added to determine the property type weightage.

Mapping the user in the character profile matrix may further include passing a relative weightage preference of the neighborhood weightage through the neighborhood weightage to determine a preferred neighborhood weightage for each character type, passing a relative weightage preference of the property type weightage through the property type weightage to determine a preferred property type weightage for each character type, and adding the preferred neighborhood weightage for each character type to the preferred property type weightage for each character type to determine a property weightage indicating the relative degree of property preference similarity of the user to each of the character types. For example, as shown in exemplary FIG. 19f, the relative weightage preference of the neighborhood weightage is 0.70 and the relative weightage preference of the property type weightage is 0.30. In this example, these numbers are multiplied by the neighborhood weightage numbers and property type weightage numbers, respectively, to determine the preferred neighborhood weightage and preferred property type weightage for each character type. In this example, for each character type, the resulting products are added to determine the property weightage.

Calculating the character profile score may include passing a relative weightage preference of the demographic weightage through the demographic weightage to determine a preferred demographic weightage for each character type, passing a relative weightage preference of the property weightage through the property weightage to determine a preferred property weightage for each character type, and adding the preferred demographic weightage for each character type to the preferred property weightage for each character type to determine the character profile score. For example, as shown in exemplary FIG. 19g, the relative weightage preference of the demographic weightage is 0.30 and the relative weightage preference of the property weightage is 0.70. In this example, these numbers are multiplied by the demographic weightage numbers and property weightage numbers, respectively, to determine the preferred demographic weightage and preferred property weightage for each character type. In this example, for each character type, the resulting products are added to determine the character profile score.

FIG. 20a illustrates a recommendation object profile matrix according to a method of the invention. FIGS. 20b and 20c illustrate determinations of recommendation object profile scores of first and second properties according to a method of the invention. FIG. 20d illustrates a ranking of recommendation object profile scores according to a method of the invention. Providing at least one of a customized recommendation and a customized opinion to the user based on the character profile score may include defining a plurality of recommendation object attributes divided into recommendation object attribute subsets, as shown in FIG. 20a. Providing the customized recommendation and/or customized opinion may further include defining a recommendation object profile matrix representing the likelihood that a person of at least one of the character types will fit into at least one of the recommendation object attribute subsets, as shown in FIG. 20b. Providing the customized recommendation and/or customized opinion may further include assigning a recommendation object profile score to the user using the recommendation object profile matrix and the character profile score, as shown in FIG. 20c. Providing the customized recommendation and/or customized opinion may further include providing the customized recommendation to the user based on the recommendation object profile score, as shown in FIG. 20d. The recommendation object can be at least one of a property, a tool, a new project listing, an article, a pricing index, a promotion, a sorting preference, and a home furnishing, and, when the recommendation object is a property, the recommendation object attributes are property attributes that include at least one of neighborhood, property type, buildup area and number of rooms.

Once a user is assigned a character profile score, the character profile score may be used to provide recommendations and opinions to personalize the user's experience. The recommendation object profile matrix may be used to identify the recommendations and opinions that are most relevant to the user. The assignment of a recommendation object profile score to the user may be used to identify the property that is most relevant to the user's needs.

As shown in exemplary FIG. 20a, when the recommendation object is a property, the recommendation object attributes may include neighborhood and property type. Further, the recommendation object attributes may be divided into recommendation object attribute subsets (e.g., the "neighborhood" attribute may be divided into the different neighborhoods shown, and the "property type" attribute may be divided into the different property types shown).

Assigning the recommendation object profile score may includes mapping the user in the recommendation object profile matrix using the character profile score, and calculating the recommendation object profile score. Mapping the user in the recommendation object profile matrix may include passing the character profile score through the recommendation object profile matrix to calculate recommendation object attribute fit scores indicating, for each character type, the likelihood that the user would desire each of the recommendation object attributes. Calculating the recommendation object profile score may include adding the recommendation object attribute fit scores for each property attribute to calculate recommendation object attribute fit total scores, and adding the recommendation object attribute fit total scores to calculate the recommendation object profile score.

For example, as shown in exemplary FIGS. 20b and 20c (each representing calculations for a different property; FIG. 20b is for exemplary property BGS 1001 and FIG. 20c is for exemplary property BGS 1002), the recommendation object profile matrix contains the preferred recommendation object points (e.g., property attribute points) assigned to each predefined recommendation object attribute for each property to which the user is being mapped (e.g., property attribute for each property), the character profile score is multiplied by the preferred recommendation object points to calculate preferred recommendation object attribute fit scores for the user, and the preferred recommendation object attribute fit total scores are added to determine the recommendation object profile score. In these examples, the recommendation object profile score for exemplary property BGS 1001 is 8820, and the recommendation object profile score for exemplary property BGS 1002 is 7960.

Providing the customized recommendation may include ranking the recommendation object profile score with other recommendation object profile scores, selecting a number of high-ranking recommendation object profile scores, and recommending the recommendation object associated with the high-ranking recommendation object profile scores to the user. For example, as shown in exemplary FIG. 20d, the recommendation object profile scores for exemplary properties BGS 1001 and BGS 1002 are ranked with recommendation object profile scores for other exemplary properties, and, as shown, exemplary property BGS 1001 is ranked first most relevant to the user and exemplary property BGS 1002 is ranked fourth most relevant to the user.

Figure 20E:
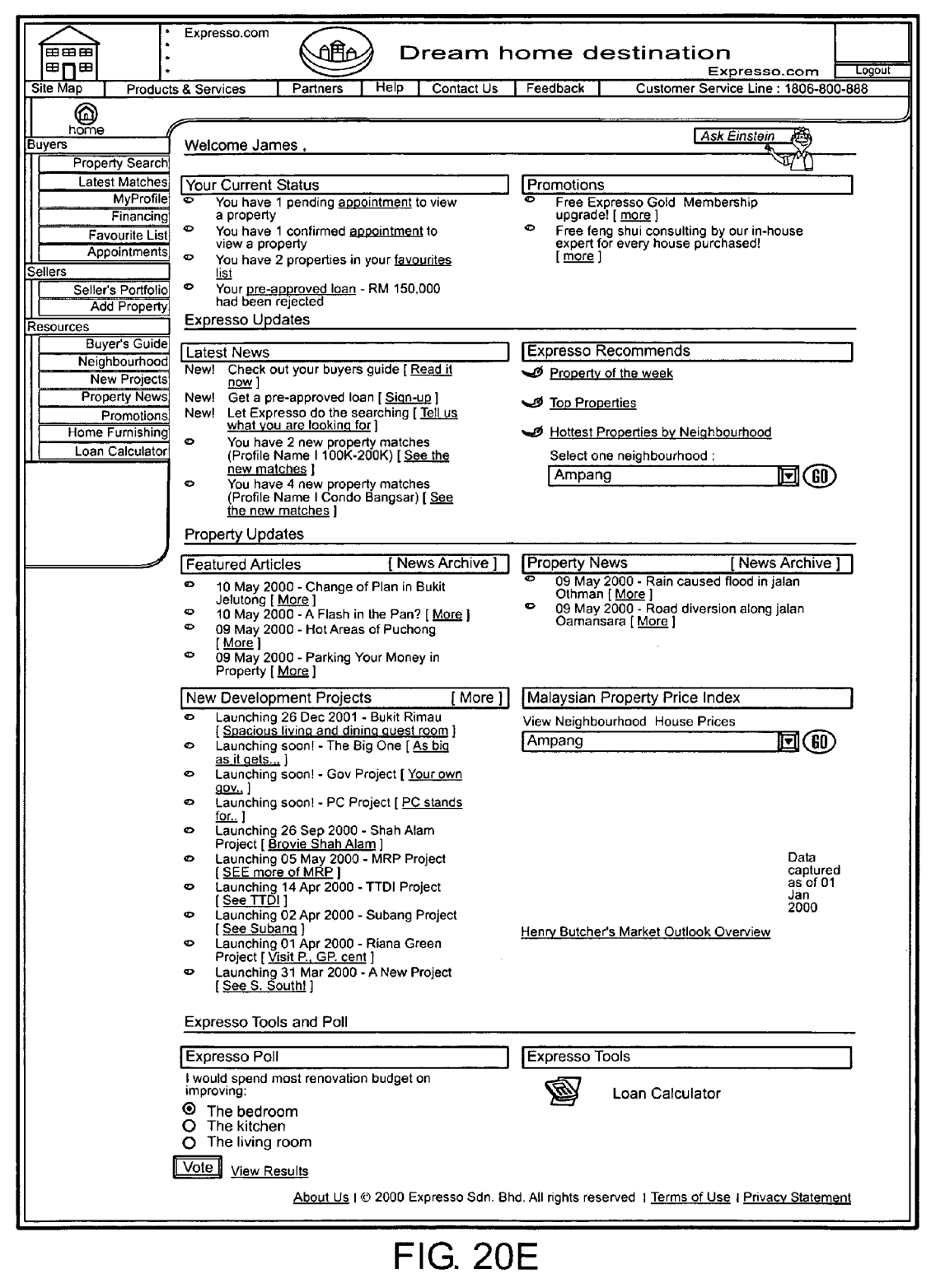

FIG. 20e is an exemplary image of a personalized web page according to a method of the invention and illustrates that using a similar model, the system 8 is able to provide personalized and/or customized recommendations of other recommendation objects. When the user visits a personalized home page, the system 8 can recommend several recommendation objects that are most relevant to the user based on the user's character profile score, such as tools (e.g., calculators and checklists), new project listings, featured articles and news items, property price indices, and promotions. When the user searches for properties and obtains search results, a sorting order specified by the user may be used to list the properties in an order, or, when the user does not provide a sorting preference, the user's character profile score may be used to determine the order of the results. When the user requests home furnishing recommendations, the products can be recommended based on the themes that are most relevant to persons having a character profile score similar to the user's character profile score.

As shown in FIG. 17 at 100, the method of the invention may further include tracking at least one online action of the user to obtain user habit information, and recalculating the character profile score using the character profile matrix and the user habit information. The online action can be at least one of a property search, a profile search, a property price search, a change to a list of favorite properties, a request to view detailed information regarding the property, a request for an appointment to visit the property, and applying for a loan.

When the online action is a property search, the system 8 may track the property attributes that the user uses to narrow his/her search results (e.g., if the user searches for a condominium in Bangsar, 1 point is given to "Bangsar" and 1 point is given to "condominium" in the user's character profile. When the online action is a profile search, the system 8 may track the property attributes submitted by the user through the profile search details (e.g., 2 points are added to each of the property attributes he/she submits through the profile search form). More points may be awarded to property attributes gathered through the profile search than through the property search because the former may give a stronger indication of the user's preference for the type of property for which he/she is looking. When the online action is a search for house prices in a given neighborhood, points may be added to the neighborhood and to the type of property (e.g., when searching for a condominium in KLCC, 1 point is added to "KLCC" and 1 point is added to "condominium"). When the online action is adding a property to the user's "favorites" list, the property attributes of the property may be tracked (e.g., when adding a terrace house in Bangsar into the user's "favorites" list, 2 points are added to "Bangsar" and 2 points are added to "Terrace House"). More points may be awarded for such actions than for other actions because the user is showing a preference for the property. When the online action is choosing to read detailed information about a property in the user's list of "latest matches", points may be added to the property attributes because the user is showing an interest in the type of property forwarded to him/her (e.g., if the property is a condominium in KLCC, 1 point is added to "condominium" and 1 point is added to "KLCC"). When the online action is requesting an appointment to visit a property, points may be added to the property attributes (e.g., if the property is a condominium in Petaling Jaya, 5 points are added to "condominium" and 5 points are added to "Petaling Jaya"). Additional points may be awarded for such actions because the user is showing extreme interest in the property. When the online action is entering a financial and/or loan application page on the system 8, all of the activities of the user on the page may be tracked, regardless of whether or not the user submits a loan application (or other financial form) (e.g., the user's income field response is tracked to discover demographic data that the user did not submit during the registration process).

Maintaining the user's character profile score enables the system 8 to provide more accurate customized recommendations and opinions to the user. Upon the first assignment of the character profile score to the user, the system 8 can initiate the tracking of the user's habits. Once the tracking has reached an operational level (e.g., the user has a character profile score totaling 1000 points), the system 8 can identify the top 4 neighborhoods and top 2 property types most relevant to the user and recalculates the user's character profile score to replace the initial character profile score assigned to the user. For example, the user's first set of preferred neighborhoods may have been (in order of relevance) Bangsar, Shah Alam, KLCC and Petaling Jaya, but after tracking the user's habits, the system 8 may determine that the preferred neighborhoods should be (in order of relevance) Petaling Jaya, Bangsar, KLCC and Shah Alam. This process may continue over time for all of the property attributes to maintain an accurate character profile score for the user.

FIG. 21 shows a result of tracking a plurality of interactions between a system of the invention and a user of the system and illustrates that the method of the invention may further include redefining the character profile matrix using the user habit information. Data obtained by tracking the users' habits can be a source for improving the predefined character types. The system 8 may monitor all character profile scores to reassign more accurate point values to each character attribute of each predefined character type. For example, a first assignment of scores for a given character attribute (e.g., Bangsar) of seven predefined character types may have been 55, 20, 5, 10, 5, 5 and 0, to indicate the relative preference of a given character type to prefer that character attribute, but after tracking several users' habits, the system 8 may determine that the assignment of scores for the given character attribute of the seven predefined character types should be 45, 20, 15, 10, 5, 5 and 0.

Those skilled in the art will recognize that the system and method of the invention have many applications, and that the invention is not limited to the representative embodiments disclosed herein. The scope of the invention is only limited by that of the claims appended hereto.

What is claimed is:

1. A method of profiling a user of a system for assisting the buying and selling of properties, comprising:
providing at least one of a customized recommendation and a customized opinion to the user based on the character profile score, wherein assigning the character profile score comprises:
passing a relative weightage preference of a demographic weightage through the demographic weightage to determine a preferred demographic weightage for a plurality of character types;

passing a relative weightage preference of a property weightage through the property weightage to determine a preferred property weightage for the plurality of character types; and adding the preferred demographic weightage for each of the plurality of character types to the preferred property weightage for each of the plurality of character types to determine the character profile score.

2. The method of claim 1, further comprising:

receiving data associated with a plurality of character types; and receiving data associated with a plurality of character attributes and divided into character attribute subsets.

3. The method of claim 2, wherein:

the character types include at least one of yuppie, expatriate, young family, established family, teenager, elderly, and none; and the character attributes include at least one of age, income range, marital status, number of children, and nationality.

4. The method of claim 2, wherein the user is a seller and the customized recommendation is a recommendation to sell a property.

5. The method of claim 2, wherein the user is a buyer and the customized recommendation is a recommendation to buy a property.

6. The method of claim 2, wherein assigning the character profile score comprises:

receiving questionnaire answers from the user;

mapping the user in the character profile matrix using the questionnaire answers; and calculating the character profile score.

7. The method of claim 6, wherein the questionnaire answers comprise demographic data, preferred neighborhood data and preferred property type data.

8. The method of claim 1, further comprising:

tracking at least one online action of the user to obtain user habit information; and re-assigning the character profile score using the character profile matrix and the user habit information.

9. The method of claim 8, wherein the online action is at least one of a property search, a profile search, a property price search, a change to a list of favorite properties, a request to view detailed information regarding the property, a request for an appointment to visit the property, and applying for a loan.

10. The method of claim 1, wherein providing at least one of a customized recommendation and a customized opinion to the user based on the character profile score comprises:

defining a plurality of recommendation object attributes divided into a plurality of recommendation object attribute subsets;

defining a recommendation object profile matrix representing the likelihood that a person of at least one of the character types will fit into at least one of the recommendation object attribute subsets;

assigning a recommendation object profile score to the user using the recommendation object profile matrix and the character profile score; and providing the customized recommendation to the user based on the recommendation object profile score.

11. The method of claim 10, wherein:

the recommendation object is at least one of a property, a tool, a new project listing, an article, a pricing index, a promotion, a sorting preference, and a home furnishing; and when the recommendation object is a property, the recommendation object attributes comprise property attributes that include at least one of neighborhood, property type, buildup area and number of rooms.

12. The method of claim 10, wherein assigning the recommendation object profile score comprises:

mapping the user in the recommendation object profile matrix using the character profile score; and calculating the recommendation object profile score.

13. The method of claim 12, wherein:

mapping the user in the recommendation object profile matrix comprises passing the character profile score through the recommendation object profile matrix to calculate recommendation object attribute fit scores indicating, for each character type, the likelihood that the user would desire each of the recommendation object attributes; and calculating the recommendation object profile score comprises:

adding the recommendation object attribute fit scores for each property attribute to calculate recommendation object attribute fit total scores; and adding the recommendation object attribute fit total scores to calculate the recommendation object profile score.

14. The method of claim 13, wherein providing the customized recommendation comprises:

ranking the recommendation object profile score with the other recommendation object profile scores;

selecting a number of high-ranking recommendation object profile scores; and recommending to the user a recommendation object associated with at least one of the high-ranking recommendation object profile scores.

15. The method of claim 8, further comprising redefining the character profile matrix using the user habit information.

16. A method of profiling a user of a system for assisting the buying and selling of properties, comprising:

generating, using a computer program, a character profile matrix representing the likelihood that a person of at least one character type will fit into at least one character attribute subset;

assigning, using a computer program, a character profile score to the user using the character profile matrix;

providing at least one of a customized recommendation and a customized opinion to the user based on the character profile score; wherein assigning the character profile score comprises:

passing a relative weightage preference of a neighborhood weightage through the neighborhood weightage to determine a preferred neighborhood weightage for each character type;

passing a relative weightage preference of a property type weightage through the property type weightage to determine a preferred property type weightage for each character type; and adding the preferred neighborhood weightage for each character type to the preferred property type weightage for each character type to determine a property weightage indicating a relative degree of property preference similarity of the user to each of the character types.

17. A computer program product, tangibly embodied in an information carrier, for executing instructions on a processor, the computer program product being operable to cause a machine to:
  generate a character profile matrix representing the likelihood that a person of at least one character type will fit into at least one character attribute subset;
  assign a character profile score to the user using the character profile matrix;
  provide at least one of a customized recommendation and a customized opinion to the user based on the character profile score;
  pass demographic data through a demographic matrix of the character profile matrix to calculate a demographic weightage indicating a relative degree of demographic similarity of the user to each of a plurality of character types;
  pass preferred neighborhood data through a neighborhood matrix of the character profile matrix to calculate a neighborhood weightage indicating a relative degree of demographic similarity of the user to each of the character types;
  pass preferred neighborhood data through a neighborhood matrix of the character profile matrix to calculate a neighborhood weightage indicating a relative degree of neighborhood preference similarity of the user to each of the character types;
  pass preferred property type data through a property type matrix of the character profile matrix to calculate a property type weightage indicating a relative degree of property type preference similarity of the user to each of the character types;
  pass a relative weightage preference of the neighborhood weightage through the neighborhood weightage to determine a preferred neighborhood weightage for each character type;
  pass a relative weightage preference of the property type weightage through the property type weightage to determine a preferred property type weightage for each character type; and
  add the preferred neighborhood weightage for each character type to the preferred property type weightage for each character type to determine a property weightage indicating a relative degree of property preference similarity of the user to each of the character types.

18. A computer program product, tangibly embodied in an information carrier, for executing instructions on a processor, the computer program product being operable to cause a machine to:
  generate a character profile matrix representing the likelihood that a person of at least one character type will fit into at least one character attribute subset;
  assign a character profile score to the user using the character profile matrix;
  provide at least one of a customized recommendation and a customized opinion to the user based on the character profile score, wherein a instructions to assign the character profile score comprises instructions to:
  pass a relative weightage preference of a demographic weightage through the demographic weightage to determine a preferred demographic weightage for a plurality of character types;
  pass a relative weightage preference of a property weightage through the property weightage to determine a preferred property weightage for the plurality of character types; and
  add the preferred demographic weightage for each of the plurality of character types to the preferred property weightage for each of the plurality of character types to determine the character profile score.

* * * * *

UNITED STATES PATENT AND TRADEMARK OFFICE
CERTIFICATE OF CORRECTION

PATENT NO. : 7,016,866 B1
APPLICATION NO. : 09/722341
DATED : March 21, 2006
INVENTOR(S) : Wei Chin Min et al.

It is certified that error appears in the above-identified patent and that said Letters Patent is hereby corrected as shown below:

IN THE TITLE PAGES:
In Item [56] References Cited, U.S. Patent Documents, replace "2002/0023051 A1* 2/2002...Michael et al." with — 2002/0023051 A1* 2/2002 Kunzle et al. 705/38 —

In Item [56] References Cited, Other Publications, replace "Beighbeder, Easing workforce reduction, Risk Management, v.47n5, pp.26-30, May 2000*" with — Beigbeder, Easing workforce reduction, Risk Management, v.47n5, pp.26-30, May 2000.* —

IN THE DRAWINGS:
In Sheet 4, Fig. 4, and in Sheet 5, Fig. 5, reference numeral (58) "Backend operational team will update the availability of the product to sold" should read as — Backend operational team will update the availability of the product to be sold —

In Sheet 7, Fig. 7, under the section Product Management, the phrase "Verify if Seller Authenticity" should read as — Verify Seller Authenticity —

In Sheet 11, Fig. 9A, under the section Negotiator Management, the phrase "Informed Current Negotiator of Re-" should read as — Informed Current Negotiator of Appointment —

In Sheet 10, Fig. 10, under the section Negotiator Acquisition and Management, the phrase "Assign a Negotiator to a Neighbourhood" should read as — Assign a Negotiator to a Neighborhood —

In Sheet 28, Fig. 19F, the phrase "Based on the neighbourhood and property type weightage" should read as — Based on the neighborhood and property type weightage —

IN THE SPECIFICATION:
At column 1, line 62, replace "method" with — methods —

Signed and Sealed this
Twenty-ninth Day of December, 2015

Michelle K. Lee
*Director of the United States Patent and Trademark Office*

At column 3, line 34, the phrase "recommend properties, but also to recommend tools," should read as — recommend properties, tools, —

At column 6, line 4, the phrase "at least one of" should read as — at least one of the following: —

At column 6, lines 15-20, the sentence "Management of the system 8 includes as least one of maintaining at least one of the application architecture and the technical architecture and creating a management report to monitor at least one of an activity of the user, a performance measure, negotiator performance, and customer service performance." should read as — Management of the system 8 includes as least one of the following: maintaining the application architecture and/or; the technical architecture and/or; creating a management report to monitor an activity of the user and/or, a performance measure and/or, negotiator performance and/or, customer service performance. —

At column 8, lines 4-5, the phrase "by using one of the client computers running a web browser application" should read as — by using one of the client computers and by running a web browser application —

At column 8, line 9-10, the phrase "the property-for-sale information can be received from the seller at least one of" should read as — the property-for-sale information can be received from the seller by at least one of the following: —

At column 8, lines 29-30, the phrase "at least one of information regarding a duration of a posting of the property," should read as — at least one of the following information regarding a duration of a posting of the property: —

At column 10, lines 20-21, the phrase "the Maintain Property Form is displayed again an indication," should read as — the Maintain Property Form is displayed again with an indication —

At column 11, lines 10-11, the phrase "communicating with at least one of the seller and the buyer" should read as — communicating with the seller and/or the buyer —

At column 12, line 4, the phrase "monitor a status of the application," should read as — monitor the status of the application —

At column 13, line 50, the phrase "young: family, established family, teenager," should read as — young family, established family, teenager, —

At column 16, lines 32-33, the phrase "may includes mapping the user" should read as — may include mapping the user —

CERTIFICATE OF CORRECTION (continued)

At column 17, line 10, the phrase "is ranked fourth most relevant to the user." should read — is ranked fifth most relevant to the user. —

IN THE CLAIMS:

Column 19, lines 17-36, Claims 3-6 should read

— 3. The method of claim 1, wherein:
the character types include at least one of yuppie, expatriate, young family, established family, teenager, elderly, and none; and
the character attributes include at least one of age, income range, marital status, number of children, and nationality.

4. The method of claim 1, wherein the user is a seller and the customized recommendation is a recommendation to sell a property.

5. The method of claim 1, wherein the user is a buyer and the customized recommendation is a recommendation to buy a property.

6. The method of claim 1, wherein assigning the character profile score comprises:
receiving questionnaire answers from the user;
mapping the user in the character profile matrix using the questionnaire answers; and
calculating the character profile score. —

Column 20, lines 15-30, Claim 13 should read

— 13. The method of claim 12, wherein:
mapping the user in the recommendation object profile matrix comprises passing the character profile score through the recommendation object profile matrix to calculate the recommendation object attribute fit scores indicating, for each character type, the likelihood that the user would desire each of the recommendation object attributes; and
calculating the recommendation object profile score comprises:
adding the recommendation object attribute fit scores for each property attribute to calculate recommendation object attribute fit total scores; and
adding the recommendation object attribute fit total scores to calculate the recommendation object profile score. —

Column 22, lines 10-34, Claim 18 should read

— 18. A computer program product, tangibly embodied in an information carrier, for executing instructions on a processor, the computer program product being operable to cause a machine to:
generate a character profile matrix representing the likelihood that a person of at least one character type will fit into at least one character attribute subset;

CERTIFICATE OF CORRECTION (continued)
U.S. Pat. No. 7,016,866 B1 assign a character profile score to the user using the character profile matrix, provide at least one of a customized recommendation and a customized opinion to the user based on the character profile score, wherein instructions to assign the character profile score comprises instructions to:

pass a relative weightage preference of a demographic weightage through the demographic weightage to determine a preferred demographic weightage for a plurality of character types;

pass a relative weightage preference of a property weightage through the property weightage to determine a preferred property weightage for the plurality of character types; and add the preferred demographic weightage for each of the plurality of character types to the preferred property weightage for each of the plurality of character types to determine the character profile score. —